United States Patent
Tarumi et al.

[19]

[11] Patent Number: 5,918,226
[45] Date of Patent: Jun. 29, 1999

[54] WORKFLOW SYSTEM FOR OPERATING AND MANAGING JOBS WITH PREDICTING FUTURE PROGRESS OF WORKFLOW JOB

[75] Inventors: Hiroyuki Tarumi; Kenji Yoshifu, both of Tokyo, Japan

[73] Assignee: NEC Corporation, Tokyo, Japan

[21] Appl. No.: 08/584,286

[22] Filed: Jan. 11, 1996

[30] Foreign Application Priority Data

Jan. 11, 1995 [JP] Japan ................................. 7-002673

[51] Int. Cl.$^6$ ................................. G06F 17/30
[52] U.S. Cl. ....................... 707/10; 707/102; 707/103
[58] Field of Search ................................. 395/614, 622; 707/10, 102, 103

[56] References Cited

U.S. PATENT DOCUMENTS

| | | | |
|---|---|---|---|
| 5,606,689 | 2/1997 | Nakagawa | 395/622 |
| 5,664,183 | 9/1997 | Cirulli et al. | 395/614 |
| 5,680,617 | 10/1997 | Gough et al. | 707/104 |
| 5,758,351 | 5/1998 | Gibson et al. | 707/104 |

FOREIGN PATENT DOCUMENTS 6-104921  4/1994  Japan .

OTHER PUBLICATIONS

Keith D. Swenson, "Visual Support for Reengineering Work Processes", Conference on Organizational Computing Systems, (Jan. 1993), pp. 130–141.

Medina–Mora et al., "The Action Workflow Approach to Workflow Management Technology", The Information Society, vol. 9, (Oct. 1993), pp. 391–404.

Tarumi et al., "Workflow Design Support on "GG"System", Information Processing Society of Japan, Groupware Special Interest Group, (Oct. 1993), pp. 1–8.

*Primary Examiner*—Thomas G. Black
*Assistant Examiner*—Cheryl Lewis
*Attorney, Agent, or Firm*—Foley & Lardner

[57] ABSTRACT

A workflow system includes workflow defining portion for defining workflow information necessary for operating workflow job to be realized by a sequence of unit businesses for which a plurality of workers are involved, workflow operating and managing portion for managing progress of the workflow job according to workflow information defined by the workflow defining means and urging execution of the unit job, individual information managing portion for managing individual information relating to each worker involving each unit job, and workflow predicting and evaluating projection for obtaining the workflow information defined by the workflow defining means, progress information indicative of progress of job of the workflow job managed by the workflow operating and managing means, and individual information managed by the individual information managing means, and for predicting future progress of the workflow job.

26 Claims, 17 Drawing Sheets

APPOINTMENT TABLE

| START TIME | END TIME | ITEM | PREFERENTIAL ORDER |
|---|---|---|---|
| 10/20 9:00 | 10/20 12:00 | CONFERENCE A | 15 |
| 10/21 13:00 | 10/21 14:00 | MEETING B | 5 |
| 10/25 9:00 | 10/26 17:00 | BUSINESS TRIP | 20 |

JOB TASK TABLE

| JOB CONTENT | PREDICTED PERIOD REQUIRED | DEADLINE | PREFERENTIAL ORDER |
|---|---|---|---|
| WF:A10389:step2 | 5 minutes | 10/23 12:00 | 10 |
| PREPARE REPORT X | 5 hours | 10/25 17:00 | 20 |
| WF:B28472:step5 | 20 minutes | 10/24 11:00 | 5 |
| CALL TO MR. Y | 15 minutes | 10/27 12:00 | 10 |

WORKFLOW SYSTEM FOR OPERATING AND MANAGING JOBS WITH PREDICTING FUTURE PROGRESS OF WORKFLOW JOB

BACKGROUND OF THE INVENTION

1. Field of the Invention

The present invention relates generally to a workflow system managing and controlling flow of a sequence of jobs by processing workflow describing a sequence of jobs, for which a plurality of people are involved.

2. Description of the Related Art

In a workflow system for defining procedure of a sequence of jobs, for which a plurality of people are involved and operating and managing the same, operation and management of the jobs are performed according to the job procedure.

In general, the workflow in the workflow system is a definition of data format transferred between unit jobs, responsible people of respective unit jobs and order of execution of respective unit jobs when a job is divided into a plurality of unit jobs. For instance, in case of process of job trip slip, the process may consist of a first unit job to prepare the job trip slip, a second unit job to approve the job trip slip, a third unit job to make reservation of tickets and hotel, a fourth unit job to apply for settlement of the expense in the job trip and a fifth unit job to perform accounting process on the basis of application for settlement. These unit jobs are executed in the order from first unit job to the fifth unit job. The person who makes the job trip is responsible for the first and fourth unit jobs amongst the sequence of unit jobs. The supervisor of the person who makes the job trip is responsible for the second unit job. A secretary is responsible for the third unit job, and an accountant is responsible for the fifth unit jobs. On the other hand, in this case, the data to be transferred between respective unit jobs is a job trip slip.

While respective unit jobs are sequentially executed in one-by-one basis in the example of processing of the job trip slip, it is also possible to define a workflow including a conditional branch, in which one of a plurality of unit jobs is executed depending upon a condition, or a workflow including a plurality of unit jobs to be performed in parallel.

It is also possible to provide a preferential order for the workflow jobs. Here, the term "preferential order" is a parameter determining order of a plurality of unit jobs to be performed preferentially. It is also possible to define a deadline for the workflow jobs. The deadline should be not only the definition of the final time limit but also the tine limits for the respective unit jobs.

In application of such workflow system, it becomes necessary to have an exceptional operation, a flexible operation, a complete appreciation of direction of operation at the occurrence of situation obstructing performance of jobs or when modification of procedural order or preferential order of the jobs from normal order is desired. For example, when a person who is assigned for performing one job defined in the workflow is busy in other jobs or has a schedule for taking a vacation, sticking on the normal procedure inherently causes obstruction of the jobs. Thus, it becomes necessary to re-assign the job in question or shorten the procedure. Also, when a job for specific client is desired to be performed particularly preferentially, it becomes necessary to make all of the personals involved in the job appreciate such modification of the preferential order.

In such case, the conventional workflow systems have taken a measure employing functions discussed below, for example.

Firstly, by setting deadlines for each worker in performing assigned works, a predetermined special measure is taken when the deadline is expired. This type of conventional technology has been disclosed in Japanese Unexamined Patent Publication (Kokai) No. (Heisei) 6-104921, for "Document Circulation method and Document Circulating System". In the above-identified publication, there is a disclosure for means for urging performance of the unit job for the job, on which the deadline has past.

Secondly, there is a technology for replacing a part of definition of the workflow with another definition or for newly adding partial definition of the workflow by means of a dedicated editor. This type of prior art has been disclosed in R. Medina-mora, T. Winograd, R. Flores, F. Flores "The Action Workflow Approach to workflow Management Technology", The Information Society, Vol 9, pp 391 to 404, and Keith D. Swenson, "Visual Support for Reengineering Work Processes", Conference on Organizational Computing Systems, on Nov. 1 to 5, 1993, pp 130 to 141.

However, in the first mentioned prior art, measure can be taken only after occurrence of passing of the deadline. Namely, this technology does not predict occurrence of problem. Therefore, it is not possible to avoid occurrence of the problem.

Also, in the second mentioned prior art, measure can be taken only when the person in charge of the job or manager becomes aware of the occurrence of the problem and modifies the own workflow. Namely, it is not possible to manage the status or to take a measure by predicting the occurrence of problem. This is the first defect in the prior art.

On the other hand, in the prior art, as set forth with respect to the first defect, measure can be taken only after occurrence of the problem. Therefore, it has been not possible to flexibly apply the workflow job which should be widely considered other than the purpose of solution of the specific problem. For instance, when a certain matter is to be given higher preferential order than other matters due to change of direction of the organization, there has been no way to deal with. This is the second defect in the prior art.

Furthermore, when the foregoing second method, namely the method to replace a part of definition of the workflow with another definition, the dedicated editor for the workflow definition has to be made active and thus cannot modify the operation of the workflow with a user interface which can directly effect modification with monitoring status of performance of the workflow. Thus, operation becomes completed. This is the third defect of the prior art.

SUMMARY OF THE INVENTION

It is a first object of the present invention to provide a workflow system which can solve the above-mentioned defects and permits management of status of progress of jobs in operation of the workflow and taking measure with prediction of occurrence of a problem before the problem actually occurs.

A second object of the present invention is to provide a workflow system which permits flexible modification of the workflow of job corresponding to variation of the status, such as change of direction of an organization and so forth, in addition to the first object.

A third object of the present invention is to provide a workflow system which can have a user interface permitting modification of operation of the workflow by directly effecting modification with monitoring status of progress of the workflow, in addition to the first and second objects as set forth above.

According to one aspect of the invention, a workflow system comprises:

workflow defining means for defining workflow information necessary for operating workflow job to be realized by a sequence of unit businesses for which a plurality of workers are involved;

workflow operating and managing means for managing progress of the workflow job according to workflow information defined by the workflow defining means and urging execution of the unit job;

individual information managing means for managing individual information relating to each worker involving each unit job; and workflow predicting and evaluating means for obtaining the workflow information defined by the workflow defining means, progress information indicative of progress of job of the workflow job managed by the workflow operating and managing means, and individual information managed by the individual information managing means, and for predicting future progress of the workflow job.

The individual information managing means may receive definition of the unit job relating to each worker from the workflow operating and managing means and preparing a job task table as a table, as a list of unit jobs to be executed by each worker, and the individual information managed by the individual information managing means includes an appointment table indicative of a constraint time of the schedule of the worker.

If future behavior is predicted with the workflow by the workflow predicting and evaluating means, the system may be further provided with a workflow operating status reporting means for reporting detection of obstruction to a manager of the workflow job or worker of the unit job., When the workflow predicting and evaluating system predicts future obstruction of workflow job, the system may further comprise workflow operation modifying means for transferring instruction for modifying the workflow information to the workflow operating and managing means to make the latter to perform modification.

The workflow system may further comprise:

workflow operating status reporting means for detecting failure and reporting detection of failure to a manager of the workflow job or worker on the unit business when future obstruction of the workflow job is predicted by the workflow predicting and evaluating system;

workflow operation modifying means for transferring instruction for modifying the workflow information to the workflow operating and managing means to make the latter to perform modification when the workflow predicting and evaluating system predicts future obstruction of workflow job;

the workflow predicting and evaluating means for reporting the failure employing the workflow operating status reporting means or performing modification of workflow information employing the workflow operation modifying means.

The workflow system may further comprise:

organization status recording and managing means for holding target to achieve in maximum or minimum number of the of workflow jobs to be achieved with a given herein, receiving progress status information indicative of progress condition from the workflow operating and managing means, comparing the progress status information and the target to be achieved;

the workflow predicting and evaluating means predicting future progress and further predicting whether the achievement condition of the workflow job of the organization may satisfy the condition of the target to be achieved or not.

The workflow system may further comprises:

organization status recording and managing means for holding target to achieve in maximum or minimum number of the of workflow jobs to be achieved with a given herein, receiving progress status information indicative of progress condition from the workflow operating and managing means, comparing the progress status information and the target to be achieved;

the workflow predicting and evaluating means predicting whether the achievement condition of the workflow job of the organization may satisfy the condition of the target to be achieved or not.

The workflow predicting and managing means may comprise:

individual information temporary storage means for collecting copy of appointment table the individual information managed by the individual information managing means;

work completion simulation means for predicting a time for completing the job task provided to each worker with reference to the job task table and appointment table temporarily stored in the individual information temporary storage means;

completion time measuring means for obtaining workflow information defined by the workflow defining definition and progress information managed by the workflow operating and managing means, predicting a time to complete overall job by making prediction of time to complete each unit job of the workflow job under execution or before execution, and making judgement whether the workflow job may be completed or not on the basis of said workflow information. The said completion time predicting means may study definition of workflow information enabling keeping of deadline and modifying said workflow information according to new definition when said complete time predicting means makes judgement that the workflow job will pass said deadline. The workflow system may further comprise work completion strategical model providing means for providing strategical model determining order for completing the job in job task defined in said job task table of said individual information and constraint time defined in said appointment table.

The individual information managed by individual information managing means may include a job task table as a list of unit jobs to be executed by each worker prepared on the basis of definition of said unit jobs relating to each worker managed by said workflow operating and managing means;

said workflow predicting and managing means may comprise:

individual information temporary storage means for collecting copy of appointment table the individual information managed by said individual information managing means;

work completion simulation means for predicting a time for completing the job task provided to each worker with reference to said job task table and appointment table temporarily stored in said individual information temporary storage means;

completion time measuring means for obtaining workflow information defined by said workflow defining definition and progress information managed by said workflow operating and managing means, predicting a time to complete overall job by making prediction of time to complete each unit job of the workflow job under execution or before execution, and making judgement whether the workflow job may be completed or not on the basis of said workflow information.

The individual information managed by individual information managing means may include a job task table as a list of unit jobs to be executed by each worker prepared on the basis of definition of said unit jobs relating to each worker managed by said workflow operating and managing means;

said workflow predicting and managing means may comprise:

individual information temporary storage means for collecting copy of appointment table the individual information managed by said individual information managing means;

work completion simulation means for predicting a time for completing the job task provided to each worker with reference to said job task table and appointment table temporarily stored in said individual information temporary storage means;

completion time measuring means for obtaining workflow information defined by said workflow defining definition and progress information managed by said workflow operating and managing means, predicting a time to complete overall job by making prediction of time to complete each unit job of the workflow job under execution or before execution, and making judgement whether the workflow job may be completed or not on the basis of said workflow information.

According to a second aspect of the invention workflow system comprising:

workflow defining means for defining workflow information necessary for operating workflow job to be realized by a sequence of unit businesses for which a plurality of workers are involved;

workflow operating and managing means for managing progress of the workflow job according to workflow information defined by said workflow defining means and urging execution of the unit job;

individual information managing means for managing individual information relating to each worker involving each unit job;

workflow predicting and evaluating means for obtaining the workflow information defined by said workflow defining means, progress information indicative of progress of job of the workflow job managed by the workflow operating and managing means, and individual information managed by the individual information managing means, and for predicting future progress of the workflow job;

workflow operating status reporting means for reporting detection of obstruction to a manager of said workflow job or worker of said unit job, when future boarder is predicted with said workflow by said workflow predicting and evaluating means; and workflow operating means receiving said workflow information from said workflow defining means, receiving said progress condition information from said workflow operating and managing means for displaying both information, inputting modification command for said workflow information from a manager to transfer to said workflow operating and managing means to make modification of workflow information.

The workflow operating means may comprise:

workflow current status display means for displaying current progress status of said workflow information; and command input means receiving modification of workflow information from user by a graphical interface utilizing display of said workflow current status displaying means, deletion of workflow job, and receiving input for command for changing of person in charge of workflow job, and transferring to said workflow operating and managing means.

The command input means may receives a command for modifying preferential order as a value indicative of difference of importance in comparison with other workflow job with respect to workflow job displayed in said workflow current status displaying means.

According to the third aspect of the invention, a workflow system comprising:

workflow defining means for defining workflow information necessary for operating workflow job to be realized by a sequence of unit businesses for which a plurality of workers are involved;

workflow operating and managing means for managing progress of the workflow job according to workflow information defined by said workflow defining means and urging execution of the unit job;

individual information managing means for managing individual information relating to each worker involving each unit job;

organization status recording and managing means for holding target to achieve in maximum or minimum number of the of workflow jobs to be achieved with a given herein, receiving progress status information indicative of progress condition from said workflow operating and managing means, comparing the progress status information and said target to be achieved;

workflow predicting and evaluating means for obtaining the workflow information defined by said workflow defining means, progress information indicative of progress of job of the workflow job managed by the workflow operating and managing means, individual information managed by the individual information managing means, and achievement status information indicative of relationship between the performance of said workflow job managed by said organization status recording and managing means, and for predicting future progress of the workflow job; and job performance direction editing means receiving and displaying said achievement status information from said organization status recording and managing means, inputting editing command of said target to be achieved of the workflow job from the manager to transfer to said organization status recording and managing means for making the latter perform correction of said target to be achieved for said workflow job.

The job performance direction editing means comprises:

status display means for displaying achievement status information indicative of relationship between the performance of the workflow job and the target to be achieved; and command input means for receiving input of editing command for the target to be achieved from the user through graphical interface utilizing display of said status display means and transfer to said organization status recording and managing means.

The status display means may display performance of workflow job and said target to be achieved in overlapping manner.

The status display means may display performance of workflow job and said target to be achieved in overlapping manner, and said command input means recognizes modification of position of display sign as modification of the target to be achieved to transfer the corresponding command to said organization status recording and managing means when the user modifies the position of the display sign indicative of the target to be achieved, displayed by said status display means.

The status display means may display performance of workflow job and said target to be achieved in overlapping manner, and said command input means recognizes modification of display of the performance as modification of the target to be achieved to transfer the corresponding command to said organization status recording and managing means when the user modifies the performance of said workflow job, displayed by said status display means.

According to the fourth workflow system comprising:

workflow defining means for defining workflow information necessary for operating workflow job to be realized by a sequence of unit businesses for which a plurality of workers are involved;

workflow operating and managing means for managing progress of the workflow job according to workflow information defined by said workflow defining means and urging execution of the unit job;

individual information managing means for managing individual information relating to each worker involving each unit job;

organization status recording and managing means for holding target to achieve in maximum or minimum number of the of workflow jobs to be achieved with a given herein, receiving progress status information indicative of progress condition from said workflow operating and managing means, comparing the progress status information and said target to be achieved;

workflow predicting and evaluating means for obtaining the workflow information defined by said workflow defining means, progress information indicative of progress of job of the workflow job managed by the workflow operating and managing means, individual information managed by the individual information managing means, and achievement status information indicative of relationship between the performance of said workflow job managed by said organization status recording and managing means, and for predicting future progress of the workflow job;

job performance direction editing device having job performance direction editing means for receiving and editing said achievement status information from said organization status recording and managing means and designating responsible person of said workflow job and transferring information concerning the designated person;

status display means for displaying achievement status information indicative of relationship between the performance of the workflow job and the target to be achieved;

display operating means for enabling operation of the display of the performance and target to be achieved directly on the display screen by the user by a graphical interface utilizing the status display means;

operation analyzing means for converting the operation of the screen by means of said display operating means into a modification command of the target to be achieved;

individual defining means for defining responsible person of the workflow job; and message transferring means for transferring the message indicative of modification command of the target to be achieved of the workflow to the person in charge determined by said individual defining means.

A fifth aspect of the invention, a workflow system comprising:

workflow defining means for defining workflow information necessary for operating workflow job to be realized by a sequence of unit businesses for which a plurality of workers are involved;

workflow operating and managing means for managing progress of the workflow job according to workflow information defined by said workflow defining means and urging execution of the unit job;

individual information managing means for managing individual information relating to each worker involving each unit job;

workflow predicting and evaluating means for obtaining the workflow information defined by said workflow defining means, progress information indicative of progress of job of the workflow job managed by the workflow operating and managing means, and individual information managed by the individual information managing means, and for predicting future progress of the workflow job, and workflow operation modifying means for transferring instruction for modifying workflow information defined by the workflow defining means to said workflow operating and managing means to effect modification of the workflow information when a obstruction against further progress of workflow job is predicted by said workflow predicting and evaluating means.

The workflow operation modifying means may preliminarily notify modification of said workflow information with respect to each of responsible person of each unit job consisting said workflow job in advance of feeding the instruction for modifying the workflow information to said workflow operating and managing means, receive answer from said responsible person whether the modified workflow information is accepted or not, transfers the instruction for modification of the workflow information to said workflow operating and managing means only when all of responsible people accept the workflow information after modification.

The workflow operation modifying means may receive acceptance condition for modification of said workflow information depending upon necessity when answer is received from each responsible person, and transfers the received acceptance condition for modification of said workflow information to said workflow predicting and evaluating means, and said workflow predicting and evaluating means inputs said acceptance condition for modification of workflow information and newly perform prediction of future progress of workflow job according to said acceptance condition.

The workflow system further includes modifying condition displaying means for displaying acceptance condition for modification of workflow information from said responsible person.

The modifying condition displaying means displays the acceptance condition for modification of said workflow information, performance of the workflow job and a target to be achieved in overlapping manner.

Other objects, features and advantages of the present invention will become apparent from the detailed description given herebelow.

BRIEF DESCRIPTION OF THE DRAWINGS

The present invention will be understood more fully from the detailed description given herebelow and from the accompanying drawings of the preferred embodiments of the invention, which, however, should not be taken to be limitative to the present invention, but are for explanation and understanding only.

In the drawings:

FIG. 3 is an explanatory illustration of an exemplary format of an individual information stored in an individual information managing portion in the first embodiment of the workflow system;

DESCRIPTION OF TEE PREFERRED EMBODIMENT

The present invention will be discussed hereinafter with reference to the drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessarily obscure the present invention.

A workflow system according to the present invention monitors data, such as definition of a workflow, status of operation of the workflow, status of an organization, schedule of individual and so forth, performs operation of optimal workflow operation, and predicts or expects occurrence of problem, such as expiration of deadline, in advance by providing a workflow predicting and evaluating means predicting future progress of workflow job.

On the other hand, organization condition recording and managing means for providing target to be achieved and status of achievement of the target with respect to the workflow predicting and evaluating means, is provided. By combining the organization condition recording and managing means with the workflow predicting and evaluating means, optimal operation of the workflow in response to possible or not possible of the target value to be achieved and modification of the target to be achieved, e.g. modification of the preferential order between the matters. Therefore, flexible operation of the workflow job can be performed other than measure for particular problem.

Furthermore, by providing a workflow managing device providing a user interface monitoring and displaying the status of progress of workflow and receiving instructions for modification of the workflow job, deletion of job, change of person in charge and providing user interface capable of modification of operation of the workflow by commanding operation by the user.

On the other hand, by providing a job performance policy editing device enabling making reference, setting and modification by direct operation even for the target to be achieved, operation of the workflow job can be flexibly modified indirectly by modifying the target to be achieved in addition to direct modification of operation of respective of individual workflow jobs.

Next, the preferred embodiments of the present invention will be discussed in detail with reference to the accompanying drawings.

Figure 1:
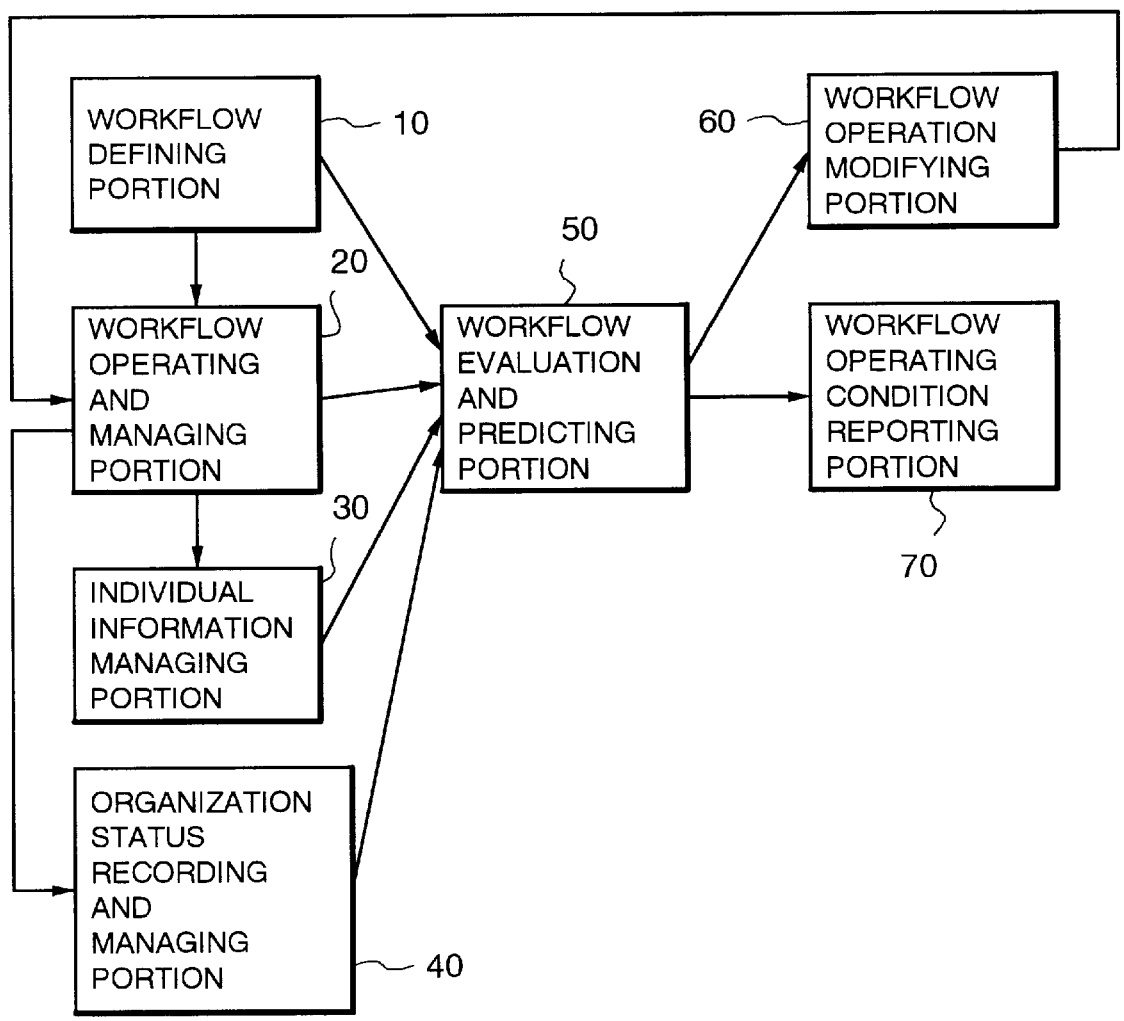
FIG. 1 is a block diagram showing a construction of the first embodiment of a workflow system according to the present invention.

FIG. 1 is a block diagram showing a construction of the first embodiment of a workflow system according to the invention.

As shown, the first embodiment of the workflow system includes a workflow defining portion 10 for performing defining of data in a workflow, a workflow operation managing portion 20 for operating and managing the workflow on the basis of the definition, an individual information managing portion 30 managing information relating to individuals involved in the workflow, an organization condition or status recording and managing portion 40 for managing status of progress of job performed by operation of the workflow over the entire organization, a workflow predicting and evaluating portion 50 for predicting and evaluating status of future operation of the job of the workflow, a workflow operation modifying portion 60 for modifying managing condition in the workflow operation managing portion 20 depending upon necessity, and a workflow operating condition reporting portion 70 for reporting operating condition of the workflow job to a manager. It should be noted that the drawing illustrates only elements particularly related to the shown embodiment and other constructions irrelevant to the subject matter of the present invention has been neglected for keeping the disclosure simple enough for facilitating clear understanding of the invention.

These components are realized by program controlled CPU and storage device, such as RAM, a magnetic disk drive and so forth. The programs realizing the functions of respective components may be provided for each function as a unit program, or, in the alternative, provided as a unitary program for a plurality of functions. Also, the workflow system is normally realized on a computer network. In such case, each component may be realized irrespective either a host computer or a terminal device. Furthermore, the function of each computer may be assigned for one computer, or a plurality of functions may be assigned to one computer.

The workflow defining portion 10 divides a job to be managed by the workflow system into a plurality of unit jobs, establishes a definition for work in each unit job, order of execution of the unit jobs, person or people in charge of the unit job, a deadline, and a format of document to be transferred between the unit jobs, and outputs the result of definition. The result of definition is referred to as workflow definition. As an example of the unit job, writing a slip, approving the slip, calculation of data on the slip and so forth may be considered. As an example of realization of the workflow defining portion 10, there is a system disclosed in "Workflow Designing Aiding System in "GG"" proposed by Information Processing Society of Japan, Groupware Special Interest Group, Oct. 28, 1993.

The workflow operation managing portion 20 is a system for receiving the workflow definition from the workflow defining portion 10, circulating the documents between the person involved according to the definition, requesting the unit jobs of the workflow to respective person in charge and urging the person in charge to keep the deadlines of respective unit jobs. Also, the workflow operation managing portion 20 has function for reporting status of operation of the workflow, i.e., the process of the unit job. An example of such system would be the system disclosed in "Workflow Designing Aiding System in "GG"".

The individual information managing portion 30 is a group of software modules, each of which is given for each person In charge of unit job nominated in the workflow definition. The individual information managing portion 30 maintains the following data.

(1) an appointment data constraining a time of the person in charge (start time, end time, matter, preferential order and so forth);

(2) data relating to each unit job to be dealt with the person in charge, which is generated associated with execution of the workflow (content of work, estimated period to be taken, deadline, preferential order and so forth);

(3) data relating to work item applied to the person in charge as duty other than data relating to (2) (content of work, estimated period required, deadline, preferential order and so forth).

Amongst, concerning data (2), by the workflow operation managing portion 20, the workflow job is automatically registered at the time reaching the person in charge, and data (1) and (3) are manually input by the person in charge. Hereinafter, the data from (1) to (3) will be generally referred to as "individual information". Also, the data (2) and (3) will be generally referred to as "job task".

Here, the preferential order in each of appointment (jb) or job task is an individually given integer value, and greater value of the preferential order is given higher preference. The value of the preferential order is assumed to be preliminarily determined. Particularly, in case of data (2), the preferential order of each unit job is given by the definition of workflow. Hereinafter, providing higher preferential order means making the value of the preferential order greater. Therefore, the following discussion will be given that the greater value of the preferential order is given the higher preference. It should be noted that the manner of giving preferential order discussed herein is only one example. It is also possible to set the smaller value of the preferential order for higher preference. It is also possible to use sign other than integer value for identifying the preferential order, such as character.

The organization condition recording and managing portion 40 accumulates information relating to the status of performance of job, and information relating to the direction of performance of job. Hereinafter, these two kinds of information will be generally referred to as "organization information". Among the organization information, the information relating to the status of performance of job of the organization is as follows, for example.

(1) how many individual workflow jobs are done within a certain period,: for example, in case of the job trip slip, number of slips processed within the a certain period;

(2) Among data transferred between arbitrary selected unit jobs in past processed workflow jobs, specific one which should be stored: in case of the job trip slip, data concerning person who made the job trip, period of the job trip, destination of the job trip and so forth;

(3) Status of workflow job under process: in case of the job trip slip, information concerning number of slips stacked and person who is holding the stacked slips.

The information concerning the status of performance of jobs of the organization is obtained from the workflow operation managing portion 20 and accumulated in the organization condition recording and managing portion 40.

The information concerning the direction of performance of the job as another organization information accumulated in the organization condition recording and managing portion 40, is as follow:

(1) number of jobs to be achieved within a specific period in connection with a specific workflow job or target to be achieved given by the maximum value or minimum value relating to the number of jobs satisfying the specific condition: in case of the example of the job trip slip, a target to restrict the number of job trip to Tokyo within a year to be less than or equal to 10 or to limit the number of jobs of the workflow for which a specific person to be less than or equal to a predetermined number;

(2) target to be reached relating to a value derived by converting the data stored in (2) in the former example among information relating to the status of performance of job: for example, restricting of the expense to be paid relating to the job trip with a specific period is assumed to be less than or equal to 500,000 Yen, and assuming the data of the job trip slip are F1. F2, F3, . . . Fn, the target value of the composite function of the function f for extracting respective item of job trip expense and the function g for deriving a total being given by g{f(F1), f(F2), ... f(Fn)}≦500,000.

The information concerning the direction of performance of the job of the organization is manually input by the user. The input of the information is aided by a later-mentioned job performance direction editing device.

The workflow predicting and evaluating portion 50 receives a plurality of workflow definitions from the workflow defining portion 10, receives the condition of operation of a plurality of workflow jobs on the basis of the workflow definition, receives individual information of respective people in charge from the individual information managing portion 30 for the people involved in respective unit jobs, and receives the organization information from the organization condition recording and managing portion 40. Then, the workflow predicting and evaluating portion 50 predicts the status of operation in the future workflow jobs, and evaluates whether operation with keeping the deadline in normal state. The detailed operation of the predicting and evaluating system will be discussed later.

When the workflow predicting and evaluating portion 50 makes judgement that the workflow job cannot be operated with keeping the deadline or that keeping the deadline is difficult, the workflow operation modifying portion 60 and the workflow operating condition reporting portion 70 are used to make attempt to modify the operation of the workflow job. Amongst, the workflow operation modifying portion 60 may perform modification of the deadline of each unit job by directly acting on the workflow operation managing portion 20, and so forth. Also, by the workflow operating condition reporting portion 70, the fact that the operation is not performed is noticed in a form of message (electronic mail, electronic emergency message, voice and so forth) to wait for the operation for modifying the operation by the manager. The detail of the workflow managing system is be described later.

Figure 2:
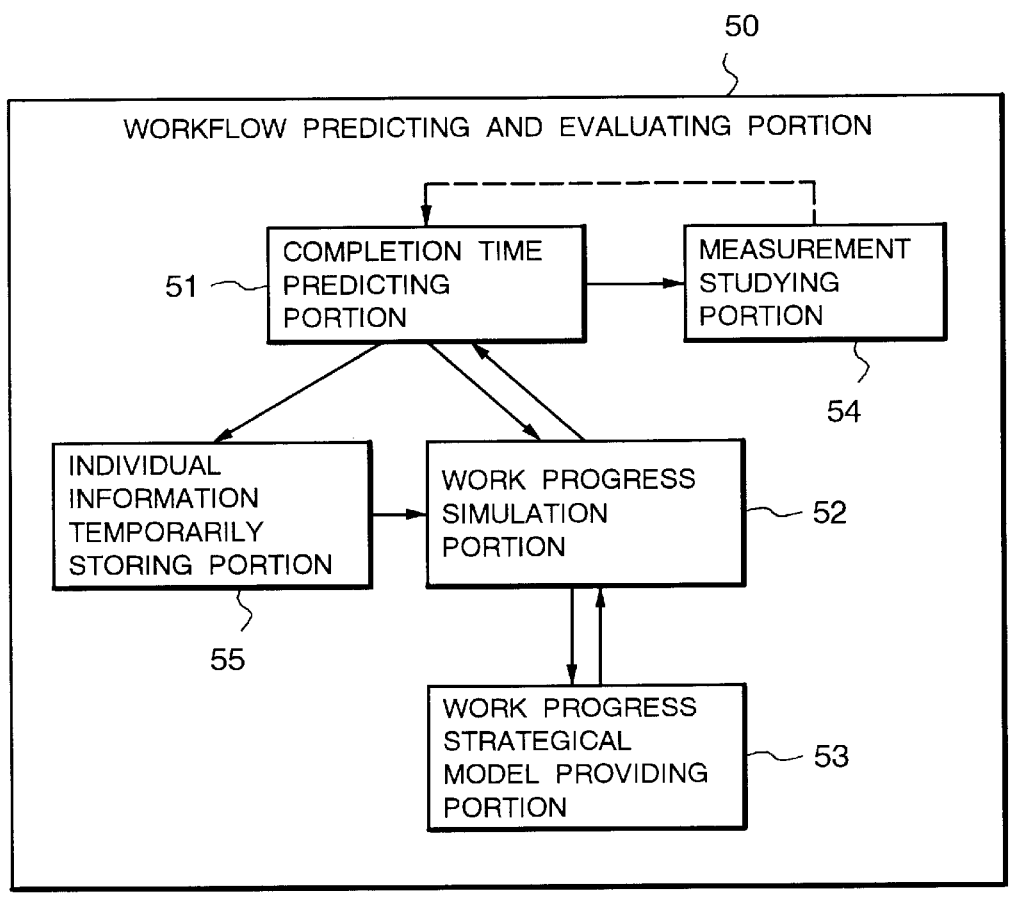
FIG. 2 is a block diagram showing a construction of a workflow predicting and evaluating portion in the first embodiment of the workflow system.

Next, detailed discussion will be given for the construction of the workflow predicting and evaluation method as a particular component of the shown embodiment, with reference to FIG. 2.

The workflow predicting and evaluating portion 50 includes a completion time predicting portion 51 for predicting a completion timing of the workflow job, a work progress simulation executing portion 52 and a work progress strategical model providing portion 53 for simulating progress of work on the basis of a predetermined strategical model, a measure studying portion 54 for executing modification of operation of the workflow job, and an individual information temporarily storing portion 55 for temporarily holding the individual information.

The individual information temporarily storing portion 55 collects and stores copies of individual information of respective individuals from the individual information managing portion 30 of respective people involved in the workflow. These individual information can be modified by the completion time predicting portion 51.

An example of the individual information for one person stored in the individual information temporarily storing portion 55 is shown in FIG. 3.

As shown, the individual information 31 for one person incluese at least an appointment table 32, a job task table 33 and a time 34.

The job task described in the job task table 33 includes tasks of the unit jobs associated with the workflow and general job tasks. In FIG. 3, the item beginning from WF are unit jobs associated with the workflow. For example, WF: A10389: step 2 means the unit job of step 2 of the workflow having identification number of 10389. On the other hand, the time 34 represents the timing, at which the individual information is obtained. This information is used to indicate the last timing of prediction upon predicting the future individual information.

The work progress simulation executing portion 52 receives the individual information stored in the individual information temporarily storing portion 55 and transfers to the work progress strategical model providing portion 53. The work progress simulation executing portion 52 further inquires prediction of the job task to be done next and the end timing.

The work progress strategical model providing portion 53 includes a strategical model for determining order of works to be done by each person. The work progress strategical model providing portion 53 provides an answer to the inquiry from the work progress simulation executing portion 52 for the next job task to be done by each person and the end timing of the job task. In concrete, the work progress strategical model providing portion 53 receives the individual information 31 from the work progress simulation executing portion 52, selects one of the job task from the job task table 33, and deletes the selected one of the job task from the job task table 33. The deleted job task is the job task predicted to be done next. The prediction of the end timing is performed on the basis of the predetermined time prediction. When the work task has been completed, the predicted time is written in the field of the time 34. Namely, the individual information 31 is updated with the predicted condition at a predetermined future timing written in the field of the time 34. The work progress strategical model providing portion 53 returns the updated individual information 31 and the content of the job task (data corresponding to one job task table 33) work progress simulation executing portion 52 predicted to be done.

As typical the strategical model owned by the work progress strategical model providing portion 53, there are ways listed as follow.

(1) process the job in the order of preferential order with maintaining the condition to complete the job task in time;

(2) process the job task in the order having shortest period to the deadline;

(3) giving higher preference to the appointment job than other job tasks; and (4) cancel the appointment job when the job task which cannot be completed in time when preferential order is forcibly given for the appointment job.

These strategical model is only exception and can be selected depending upon the content of the workflow job and so forth. In certain cases it is possible to combine the strategical models.

Figure 5:
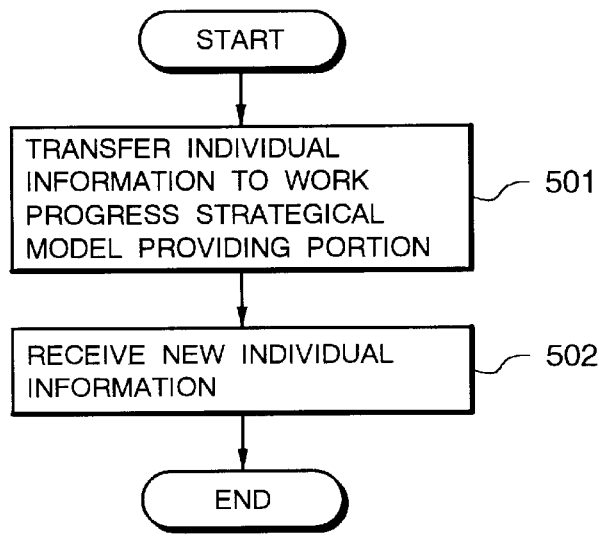
FIG. 5 is a flowchart showing an operation of a job performance simulating portion of the workflow prediction and evaluating portion in the first embodiment of the workflow system.
Figure 4:
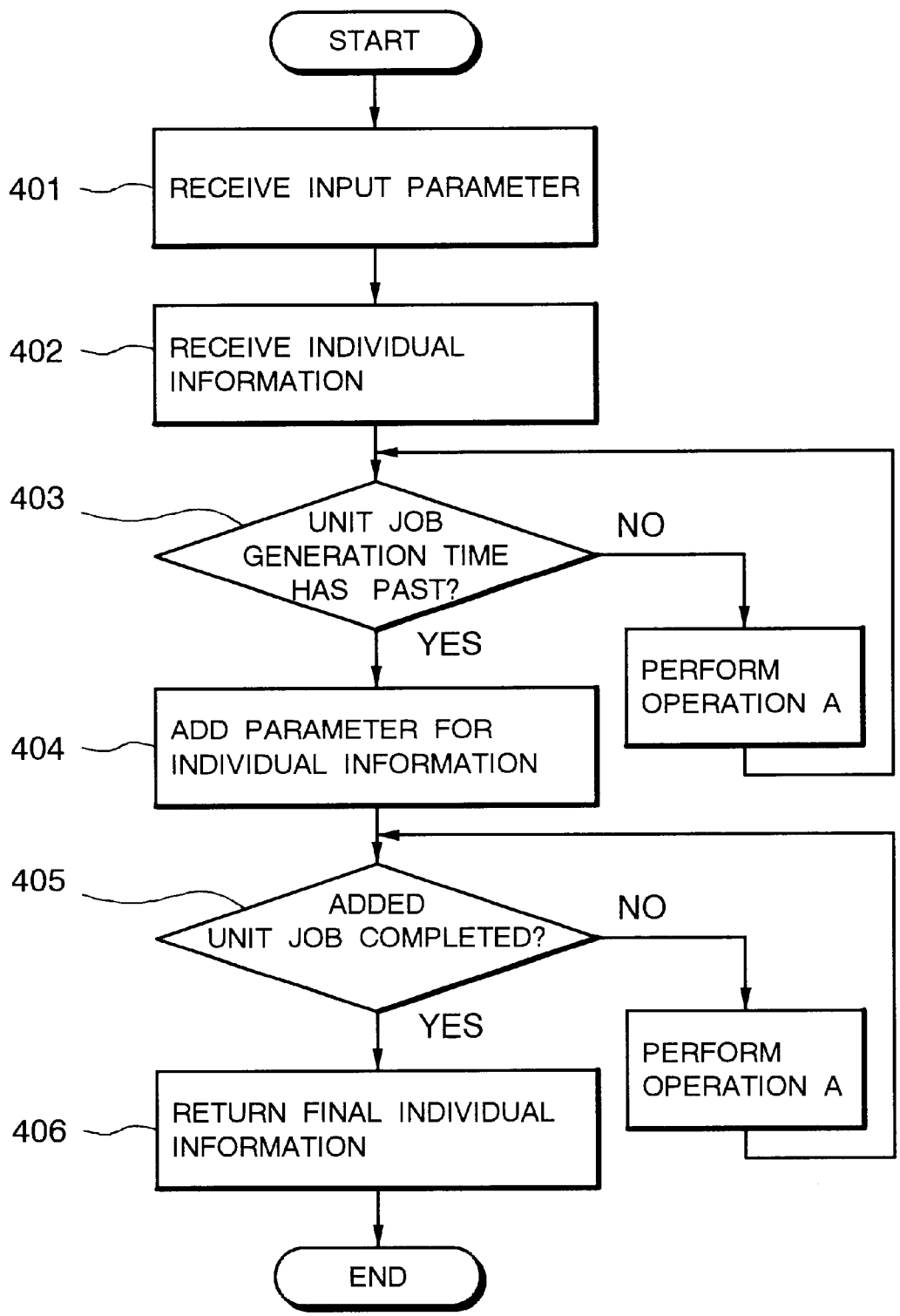
FIG. 4 is a flowchart showing an operation of a job performance simulating portion of the workflow prediction and evaluating portion in the first embodiment of the workflow system.

Examples of the strategical operation of the work progress simulation executing portion 52 are shown in FIGS. 4 and 5. The principle of this is to predict the timing of completion of the unit job of the workflow by the person through simulation when assumption is made that the workflow job reaches one person in charge at certain timing.

With reference to FIG. 4, the work progress simulation executing portion 52 receives a unit job name generated in relation to the workflow, expected time to perform the unit job, preferential order and unit job occurring time t0 as input parameters (step 401). Next, the individual information 31 is received from the individual information temporarily storing portion 55 (step 402). Then, if the time 34 in the individual information 31 is earlier than the unit time occurring time t0, the operation A shown in FIG. 5 is performed to transfer the individual information 31 to the work progress strategical model providing portion 53 (step 501) and to receive newly the updated individual information 31 (step 502). The foregoing operation is repeated until the time 34 of the individual information 31 becomes later than the unit time occurring time t0 (step 403).

When the time 34 of the individual information 31 becomes younger than the time t0, the parameter received in step 401 is added to the individual information 31 (step 404). Then, the operation A is repeated until the added unit job is completed (step 405). Subsequently, the final individual information 31 is returned to the completion time predicting portion 51 (step 406).

The completion time predicting portion 51 receives the definition of the workflow from the workflow defining portion 10 and also receives the progress condition of the workflow from the workflow operation managing portion 20. Then, in the order of the people assigned by the workflow, the work progress simulation executing portion 52 is called to simulate the job performance of respective people and thus sequentially predict occurrence of the job task associated with the workflow job. By this, the time to complete the workflow can be predicted. The predicted workflow completion time is then transferred to the measure studying portion 54.

It should be noted that the individual information 31 of the person which is updated in the simulation is again registered in the individual information temporarily storing portion 55.

Besides, the workflow job is not always performed solely, but typically, a plurality of workflow jobs are performed simultaneously. In such circumstance, it is possible that each person may have a plurality of job tasks in the workflow job. Therefore, it is meaningless to make prediction for the completion time of each workflow job in one-by one basis independently of the other, Therefore, it becomes necessary to perform simultaneous prediction for a plurality of workflow jobs. In such case, the workflow defining portion 10 and the workflow operation managing portion 20 are required to provide all of information relating to the workflow job managed by each organization. At this time, the operation of the completion time predicting portion 51 is shown in FIG. 6 in a form of the flowchart.

Figure 6:
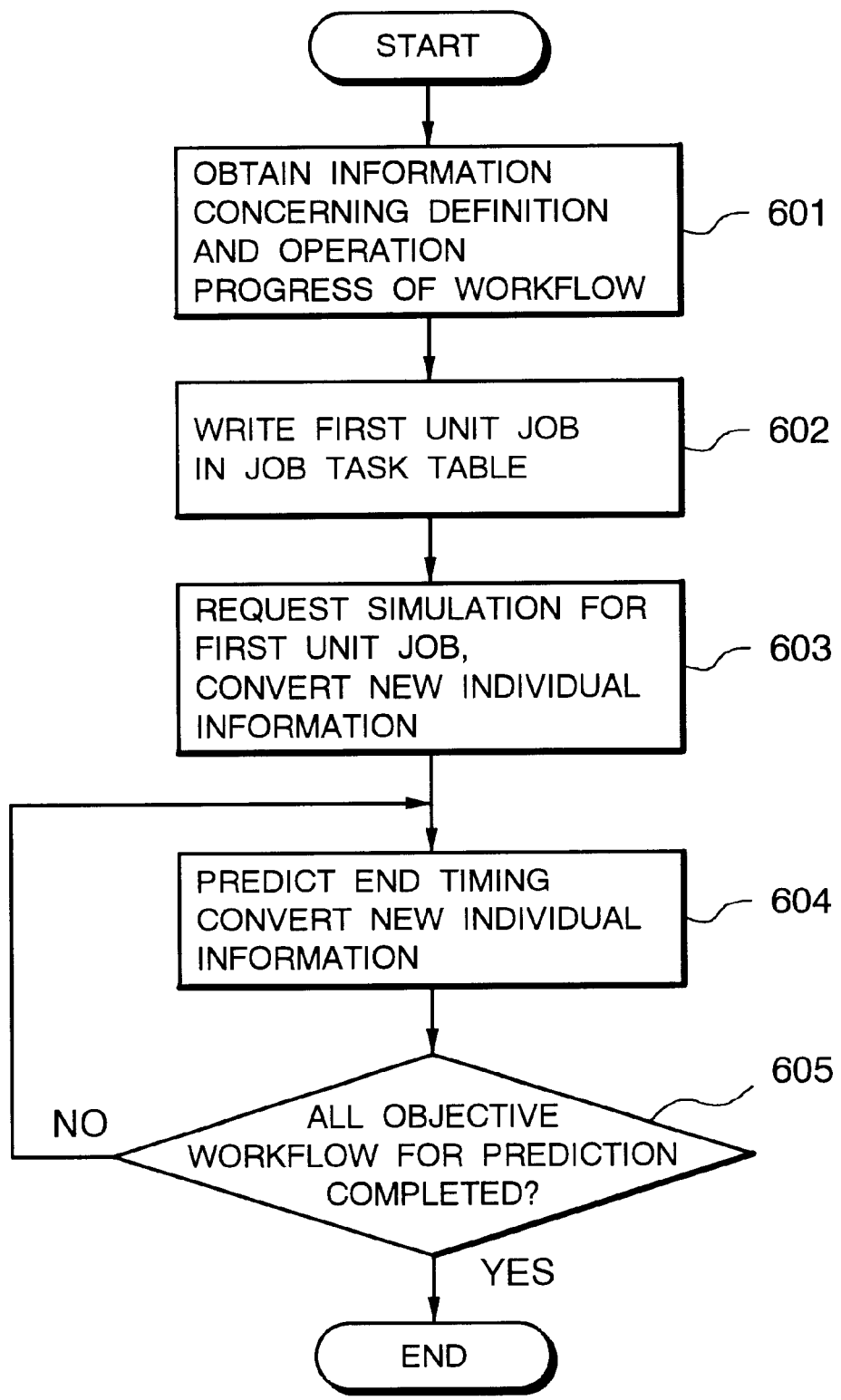
FIG. 6 is a flowchart showing an operation of a completion time predicting portion of the workflow predicting device of the first embodiment of the workflow system.

With reference to FIG. 6, the workflow predicting and evaluating portion 50 receives the workflow definition from the workflow defining portion 10 and the information concerning the progress condition of the workflow job from the workflow operation managing portion 20 (step 601). Then, the initial unit job (the unit job in operation when the workflow has already been initiated) of the workflow is written in the job task table 33 of the individual information 31 of the person in charge of the job task stored in the individual information temporarily storing portion 55 (step 602).

Next, the simulation of the first unit job of all of the workflow (the unit job in operation when the workflow has already been initiated) is requested to the work progress simulation executing portion 52. Then, the returned new individual information 31 is also returned to the individual information temporarily storing portion 55 (step 603). Next, with respect to the workflow, on which the prediction is made that the former job will be completed at the earliest timing, the completion time of the next job is predicted by requesting to the work progress simulation executing portion 52. Then, the returned new individual information 31 is returned to the individual information temporarily storing portion 55 (step 604). The operation of the step 604 is repeated until prediction is performed with respect to all of the workflow in question (step 605).

Here, depending upon the strategy model provided by the work progress strategical model providing portion 53 or the preferential order of the workflow given upon simulation by the completion time predicting portion 51, different prediction can be performed. For instance, by providing the highest preferential order for the workflow job, the time to execute the workflow in the shortest period can be predicted. In order to satisfy such function, in addition to the general function set forth with respect to the flowcharts shown in FIGS. 4 to 6, the completion time predicting portion 51 and the work progress simulation executing portion 52 are provided with functions for designating the strategy model for the work progress strategical model providing portion 53, and the completion time predicting portion 51 may have a function to modify the preferential order of the job task of the workflow temporarily.

Figure 7:
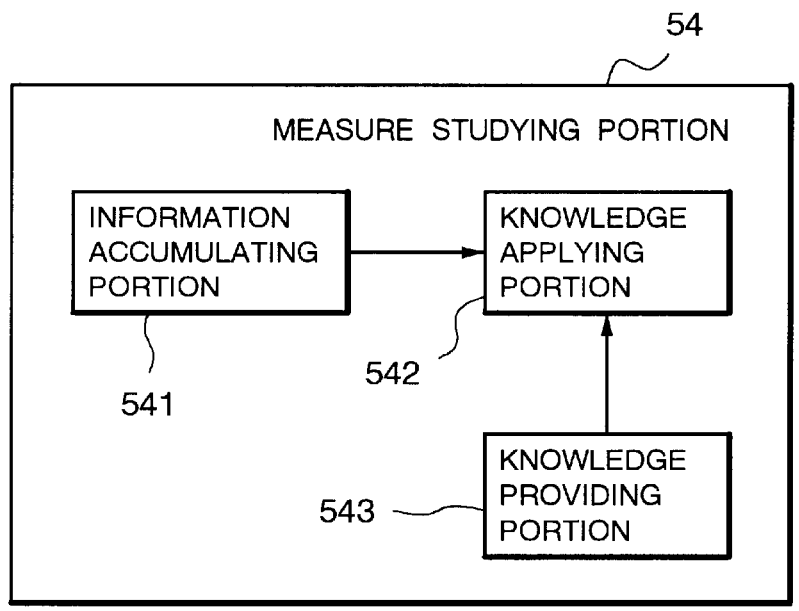
FIG. 7 is a block diagram showing a construction of a measure studying portion of the workflow predicting and evaluating portion of the first embodiment of the workflow system.

The measure studying portion 54 receives the predicted time of completion of the job from the completion time predicting portion 51 and also receives all of the information that the completion time predicting portion 51 respectively received from the workflow defining portion 10, the workflow operation managing portion 20 and the individual information managing portion 30. Also, the measure studying portion 54 receives information relating to the status of progress of job of the organization and the direction of performance of job from the organization information recording and managing portion 40. Then, on the basis of the received information, the workflow operation modifying portion 60 or the workflow operating condition reporting portion 70 are activated to take a measure. FIG. 7 is a block diagram showing an example of construction of the measure studying portion 54 utilizing the knowledge base.

An information accumulating portion 541 accumulates all information received from the completion time predicting portion 51 and the organization information recording and managing portion 40 and stores so that a knowledge applying portion 542 may make reference to at any time. The knowledge applying portion 542 analyzes the information stored in the information accumulating portion 541 in accordance with knowledge obtained from a knowledge providing portion 543, and performs the following operations depending upon the result of analysis.

(A) by requesting re-simulation after modification of parameters, such as preferential order, deadline and so forth, to the completion time predicting portion 51, new predicted completion time is obtained (in this case, the completion time predicting portion 51 once clears the content of the individual information temporarily storing portion 55 and perform re-simulation);

(B) by requesting to the workflow operating condition reporting portion 70, a notice that operation keeping the deadline cannot be done, is issued to the manager of the workflow job or to the person in charge of specific unit job;

(C) by requesting to the workflow operation modifying portion 60, a temporary modification of the definition in relation to the workflow job is requested, Here, the followings are examples of the knowledge provided by the knowledge providing portion 243:

(1) in connection with the workflow which cannot keep the deadline for completion of the unit job, re-prediction is requested to the completion time predicting portion 51 with the following attempt (see arrow in broken line in FIG. 2), and unless prediction that the deadline of the workflow in question can be kept is made in the re-prediction and such attempt would not cause any obstruction for keeping of deadline in other workflow, performance of such attempt is requested to the workflow operation modifying portion 60.

(1-1) Gradually increase the preferential order;

(1-2) When an appointment job with a long period on the person in charge causes obstruction in progress of the workflow, the preferential orders of the unit jobs generated from the workflow, on the person in charge of the workflow job and another person who is involved in the workflow job immediately preceding the person in question are gradually risen. In the alternative, the deadline for the unit job on the person in question is gradually varied to expire at earlier timing;

(1-3) Finding the appointment having the lowest preferential order among appointments which obstruct progress of workflow, such appointment with lowest preferential order is temporarily canceled;

(1-4) Modification of routine within an allowable range is attempted. Here, "Modification of routine within an allowable range" means that a director performs job for a chief and so forth, for example and is defined by a rule given by the knowledge providing proportion 243 or defined as a representing route in the workflow definition per se provided by the workflow defining portion 10.

(2) When attempt in (1) fails, request is made to the workflow operating condition reporting portion 70 to issue a notice to the manager of the workflow job;

(3) With reference to the status of progress of job and direction of performance of job obtained from organization information recording and managing portion 40 and when the direction of performance of the job is not satisfied, in order to increase number of the workflow job to be achieved within a given period, the number to be achieved is increased in the similar manner to (1), or alternatively, the number to be achieved is decreased in the reversed means (lower the preferential order or delay the deadline). If such attempt is expected to be successful, request is made to the workflow operation modifying portion 60;

(4) when the attempt in (3) is not successful, and is caused by lack of number of workflow jobs which have already initiated, a notice is given for all worker employing the workflow operating condition reporting portion 70;

(5) When the attempts in (3) and (4) are not successful, a notice is issued to the manager of the workflow job by requesting to the workflow operating condition reporting portion 70.

These references for judgement are merely exemplary, and in practice, by authorizing judgement to the knowledge base or so forth, the measure studying portion 54 which can make flexible judgement can be realized.

Figure 8:
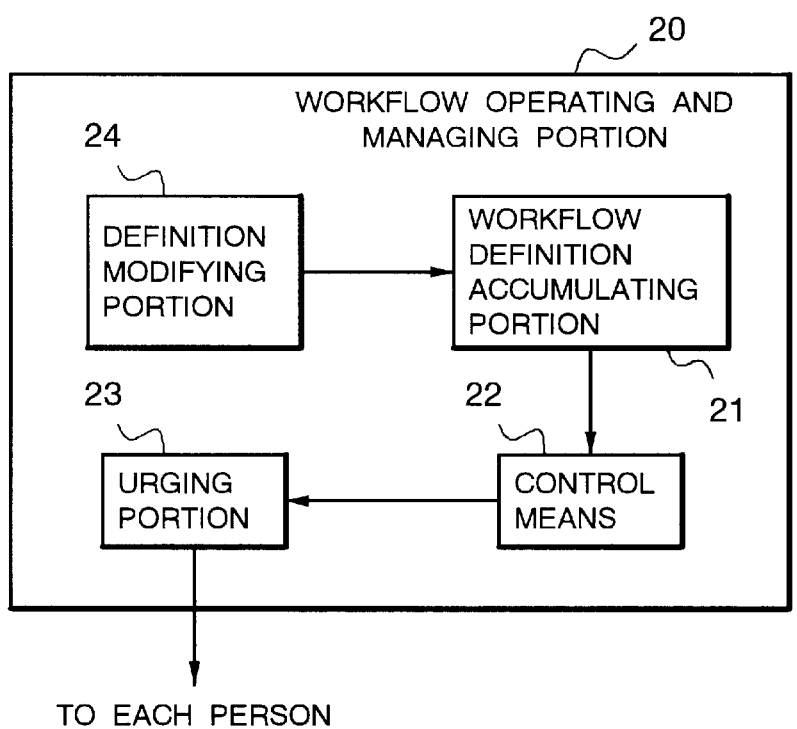
FIG. 8 is a block diagram showing a construction of a workflow operating and managing portion in the first embodiment of the workflow system.

Next, detailed description will be given for the workflow operation modifying portion 60. The workflow operation modifying portion 60 receives the request from the measure studying portion 54 in the workflow predicting and evaluating portion 50, and act on the workflow operation managing portion 20 to modify operation of the workflow job. At first, the construction of the workflow operation managing portion 20 which enables such function will be illustrated in FIG. 8.

A workflow definition accumulating portion 21 receives the definition of the workflow from the workflow defining portion 10 and stores the same so that a control portion 22 may read out the workflow definition at any time. A definition modifying portion 24 is responsive to the instruction from the workflow operation modifying portion 60 to make modification of the workflow definition accumulated in the workflow definition accumulating portion 21. At this time, when modification of definition is effected only on the job instance of specific jobs, the definition relating to such job instance is stored separately to enable partial modification relating to the job instance in question. Here, the job instance represents each individual affair to be performed, such as job trips in the workflow of application for job trip, each purchasing activity in the workflow of purchasing procedure, and so forth. Accordingly, for example, even when the deadline for the job settlement trip slip is one week from the job trip, it would be possible to modify the workflow for the specific case, such as shortening the deadline for "job trip to Tokyo on November 1 and November 2 made by Mr. A" to November 6 which is only four days of the job trip.

The control portion 22 takes out the workflow definition from the workflow definition accumulating portion 21 and operates the workflow in the order according to the definition. Record of operation is accumulated in the individual information managing portion 30 corresponding to the person in charge of the unit job and the organization information recording and managing portion 40. On the other hand, the control portion 22 urges for the person in charge of the unit job when the deadline of the unit job in the workflow comes close. For this purpose, the control portion 22 may trigger an urging portion 23. The urging portion 23 urges to the person in charge of the corresponding workflow job by means of an electronic mail, graphic display or directly displaying a message.

When the measure studying portion 54 set forth above and the workflow operation managing portion 20 are employed, the functions required for the workflow operation modifying portion 60 are modification of workflow definition requested by the measure studying portion 54 and transferring of the modification to the definition modifying portion 24. In this case, the workflow operation modifying portion 60 is only required to shape the format of the request message, and thus can be easily realized. It should be noted that the equivalent operation may be performed even when the definition modifying portion 24 is provided in the workflow operation modifying portion 60 instead of the workflow operation managing portion 20.

Figure 9:
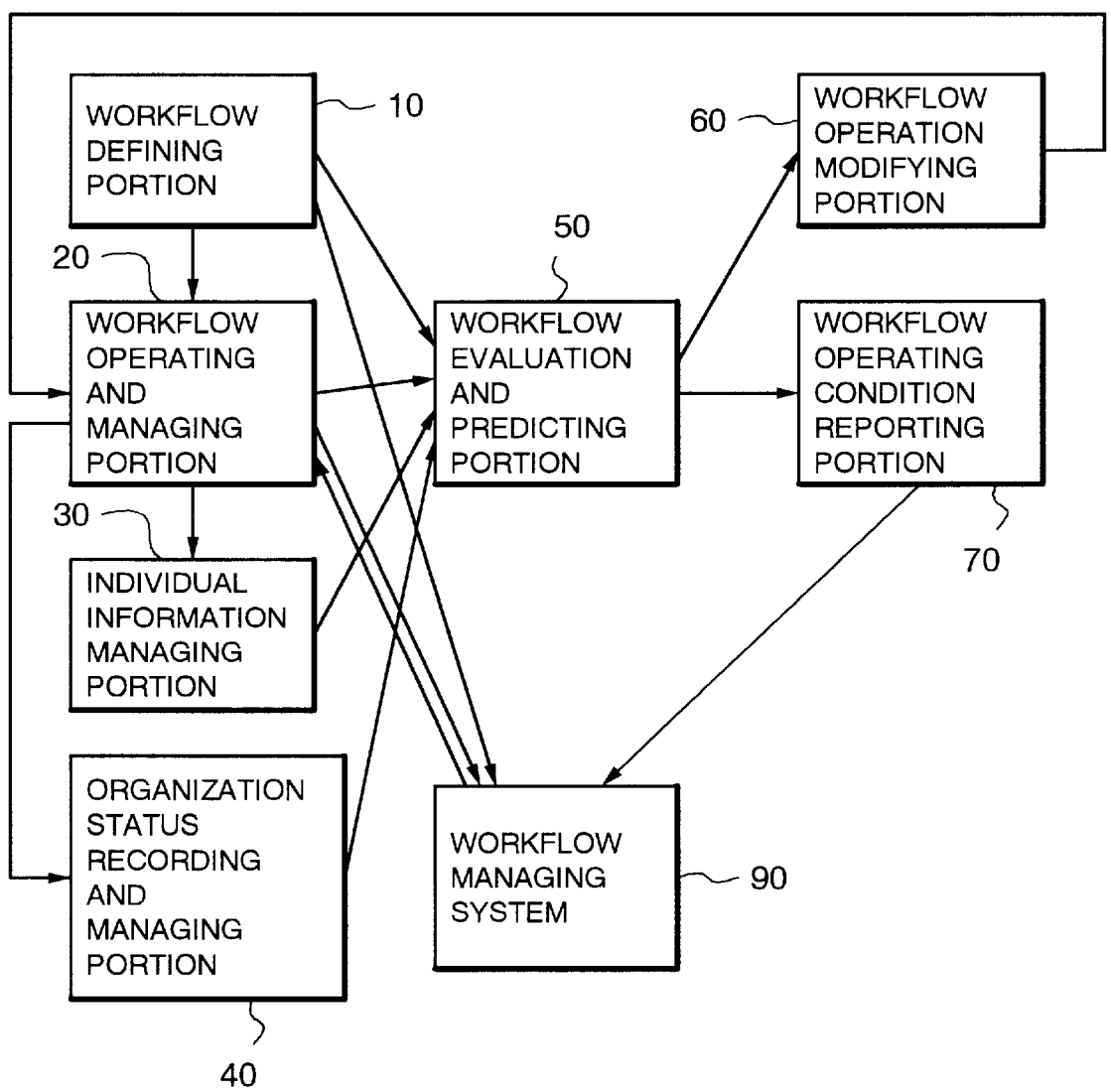
FIG. 9 is a block diagram showing a construction of the second embodiment of a workflow system according to the present invention.

FIG. 9 is a block diagram showing a construction of the second embodiment of a workflow system according to the invention.

As shown, the first embodiment of the workflow system includes the workflow defining portion 10 for performing defining of data in a workflow, the workflow operation managing portion 20 for operating and managing the workflow on the basis of the definition, the individual information managing portion 30 managing information relating to individuals involved in the workflow, the organization condition recording and managing portion 40 for managing status of progress of job performed by operation of the workflow over the entire organization, the workflow predicting and evaluating portion 50 for predicting and evaluating status of future operation of the job of the workflow, the workflow operation modifying portion 60 for modifying managing condition in the workflow operation managing portion 20 depending upon necessity, the workflow operating condition reporting portion 70 for reporting operating condition of the workflow job to a manager, and a workflow managing system 90 which aids modification of operation of the workflow job by the manager of the workflow job. It should be noted that the drawing illustrates only elements particularly related to the shown embodiment and other constructions irrelevant to the subject matter of the present invention has been neglected for keeping the disclosure simple enough for facilitating clear understanding of the invention. Also, it should be noted that the workflow defining portion 10, the workflow operation managing portion 20, the individual information managing portion 30, the organization information recording and managing portion 40, the workflow predicting and evaluating portion 50, the workflow operation modifying portion 60 and the workflow operating condition reporting portion 70 are identical to those illustrated and discussed in the first embodiment, and thus represented by the same reference numerals to the former embodiment and the detailed description there of is neglected.

Figure 10:
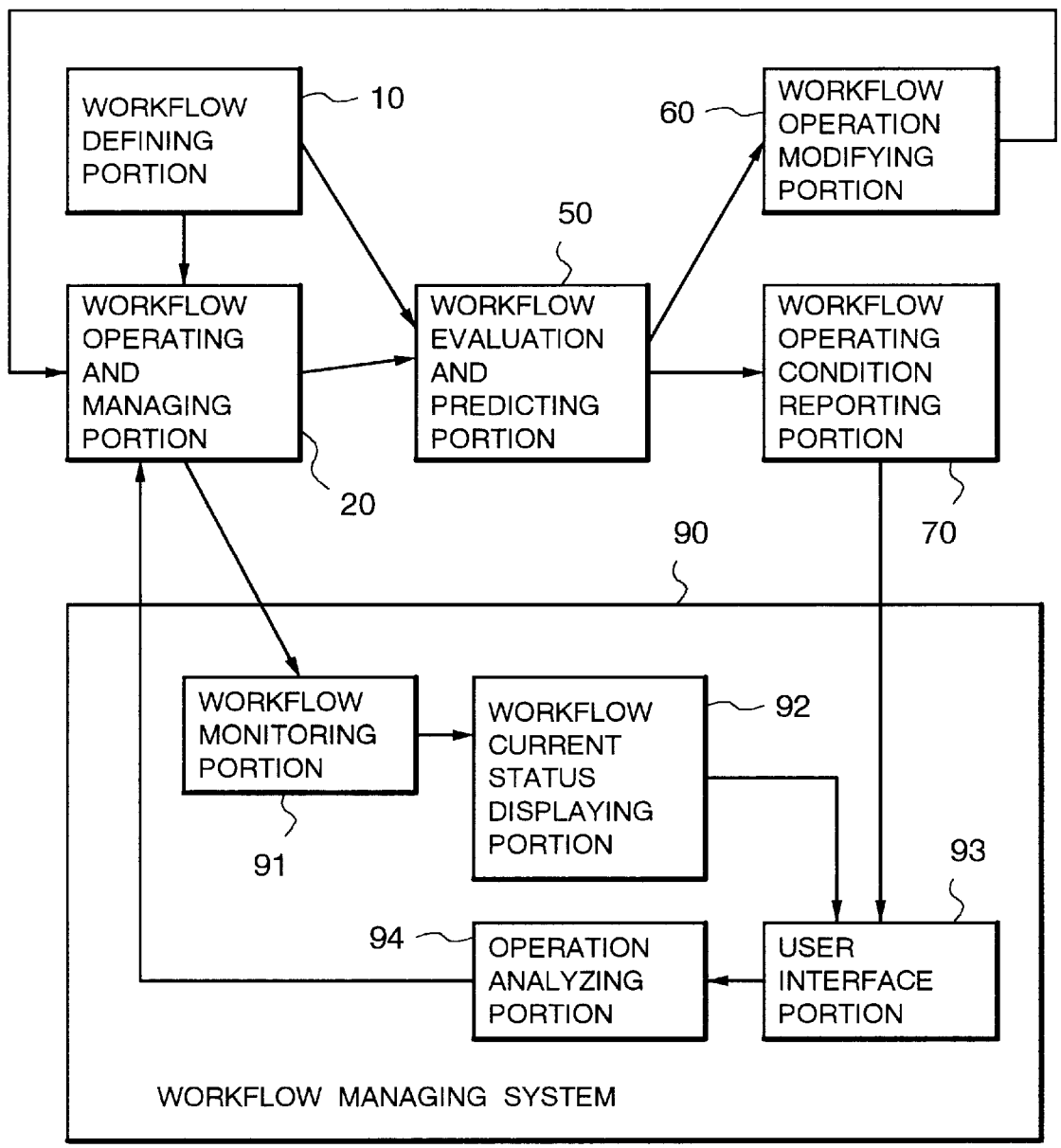
FIG. 10 is a block diagram of a workflow managing device in the second embodiment of the workflow system.

FIG. 10 is a block diagram showing a construction of the workflow managing system 90.

As shown, the workflow managing system 90 includes a workflow monitoring portion 91 for monitoring status of operation of the workflow, a workflow current status displaying device 92 for displaying the status of operation of the workflow job, an instruction inputting portion 93 for providing operation environment for performing predetermined input for the manager of the workflow job, and an operation analyzing portion 94 for performing analysis of the input from the instruction inputting portion 93.

The workflow monitoring portion 91 receives the definition of the arbitrary workflow from the workflow defining portion 10, also receives the operating status of the arbitrary job instance among job instances (since it is possible to present a plurality of job affairs during process, the job instance can present in plural) and unitarily transfers to the workflow current status displaying device 92.

The workflow current status displaying device 92 prepares a chart expressing the workflow definition on the basis of the workflow definition received from the workflow monitoring portion 91 and provide a particular mark for a node where the job instance stays on the chart. The chart and the marking indicative of the operating status thus prepared are transferred to the instruction inputting portion 93.

Figure 11:
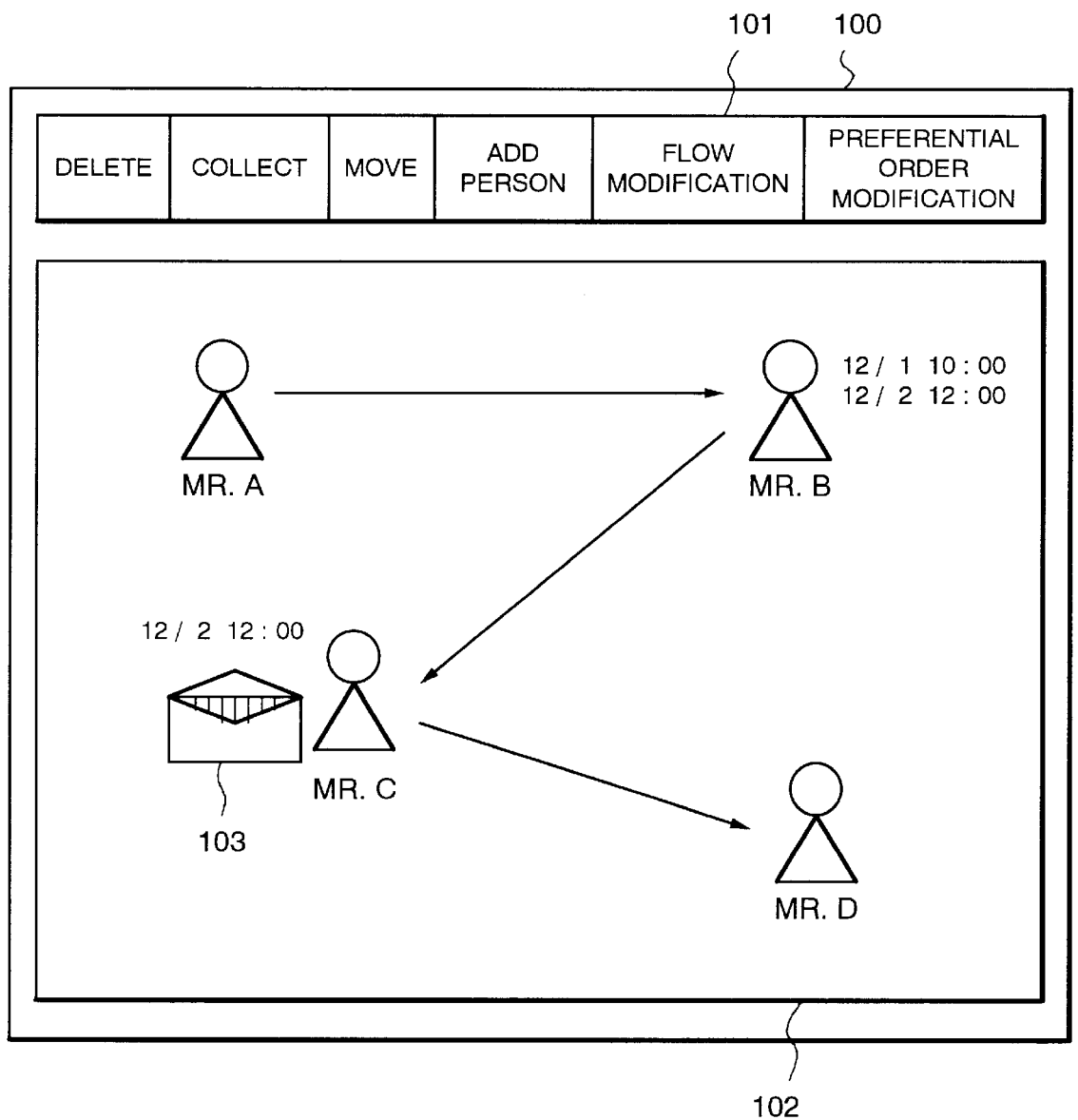
FIG. 11 is an example of display on a display screen by a workflow current status display portion in the second embodiment of the workflow system.

The instruction inputting portion 93 includes a display screen for displaying the predetermined information and an input device for performing predetermined input. The chart and the operating status received from the workflow current status displaying device 92 and the displays on the display screen. FIG. 11 shows an example of the display.

As shown, the instruction inputting portion 93 includes a display screen 100, a menu 101 and an operating status displaying portion 102. In the operating status displaying portion 102, the people in charge of the workflow jobs (Mr. A, Mr. B, Mr. C and Mr. D) associated with the workflow, a flow indicative of the job procedure between the people in charge, and a time where the each person in charge are displayed. The time at the upper column indicate the time where the unit business is reached, and the time at the termination or completion of the job.

In the example of FIG. 11, the job of Mr. A is completed at 10:00 of December 1 and the job of Mr. B is completed on 12:00 of December 2, and the jobs are simultaneously reached to Mr. C. An icon 103 indicates the place where the job is accumulated. In the shown example, the job is accumulated at Mr. C. The icon 103 is one example of the particular marking put by the workflow current status displaying device 92. The icon 103 is in a design where an envelops is opened and represents that Mr. C opens the content of the job. In addition, it is also possible to use different icons for the status which Mr. C has not yet being recognized, or while Mr. C completed the job, but has not been transferred to Mr. D.

It should be noted that while the icon 103 in the design of the envelops as the special marking , the manner of putting the marking is not limited to the above and can be providing of different color for the node, or to display a character message, such as "under process" and so forth can be employed.

The instruction inputting portion 93 performs displaying of the status of operation as shown in FIG. 11 as set forth above, and, in conjunction therewith receives input relating to operation of the workflow job (job instance) employing the menu 101 by the user (in this case, the user should be the manager of the workflow job). The content of operation employing the menu 101 is transferred to the operation analyzing portion 94.

Here, discussion will be given for a method of direct operation employing the menu 101 in the example of FIG. 11. The word "delete" means deletion of the job instance per s. The word "collect" means returning the staying job instance to the manager. These two operations can be executed by clicking corresponding position of the menu 101. The word "move" is to assign the job instance in staying condition. This operation can be realized by clicking the desired position, and subsequently by selecting and clicking the person in charge in the moving destination. Discussing the example of FIG. 11, in the either case of "delete", "recollect" and "move", the job is taken away from the Mr. C. In case of "delete", the job instance per se disappears. On the other hand, in case of "recollection", the job is transferred to the manager and in case of "move", the job instance is transferred to the third party (Mr. A, Mr. B, Mr. C, Mr. D or additional worker added by "addition of worker").

Figure 12:
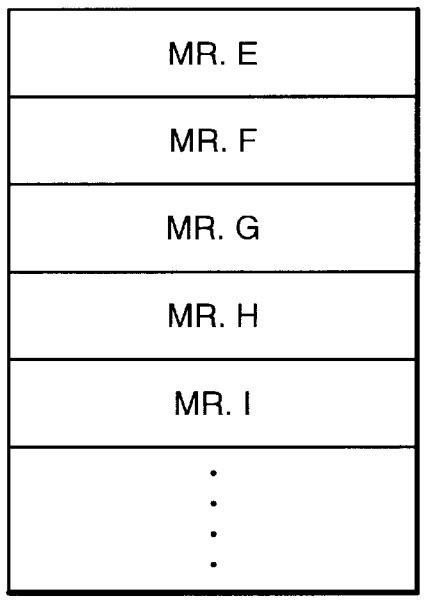
FIG. 12 is an example of menu display on a display screen by a workflow current status display portion in the second embodiment of the workflow system.

Among the menu 101, "add worker" adds a person who is not nominated in the operating status displaying portion 102 for displaying. In this operation, the person to be added is selected from after clicking the "addition of worker" and then select the person to be added on the menu 101. FIG. 12 is an illustration showing one example of the menu for selecting the person.

Figure 13:
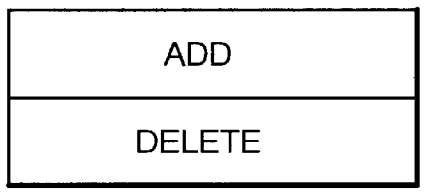
FIG. 13 is an example of menu display on a display screen by a workflow current status display portion in the second embodiment of the workflow system.

"Flow Modification" is performed for addition and deletion of the workflow chart displayed on the operating status displaying portion 102. Either addition or deletion is selected on other menu (shown in FIG. 13, for example) displayed after clicking "Flow Modification". In case of addition, with the pointing device, such as a mouse, the flow can be described by the arrow with the solid line. In case of deletion, the arrow on the operating status displaying portion 102 is deleted.

Figure 14:
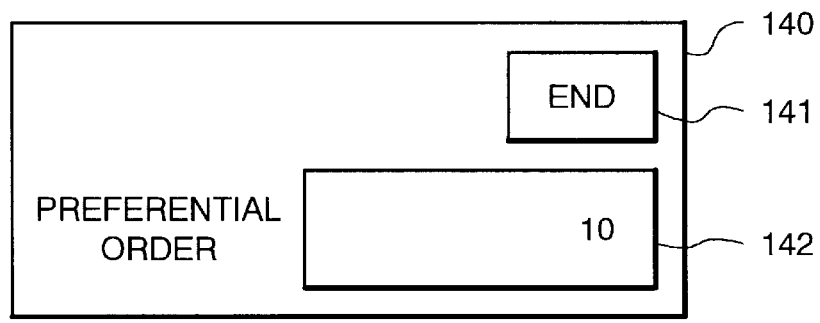
FIG. 14 is an example of input screen on a display screen by a workflow current status display portion in the second embodiment of the workflow system.

"Preferential Order Modification" is an operation for modifying the preferential order of each unit job generated associating with execution of the workflow. When the menu of "Preferential Order Modification" is clicked, another screen 140 as shown in FIG. 14 appears. In this example, the current value of the preferential order is 10. By directly writing the new preferential order value in a preferential order displaying field 142 and depressing an end button 141, modified new preferential order can be set.

The operation analyzing portion 94 receives a data string indicative of the content of operation instructed by the menu 101, converts the command in a form which can be accepted by the definition modifying portion 24 of the workflow operation managing portion 20. By this, according to the command given by the user of the workflow managing system 90 with using the menu 101 of the command inputting portion 93, the practical operation of the workflow is performed.

Figure 15:
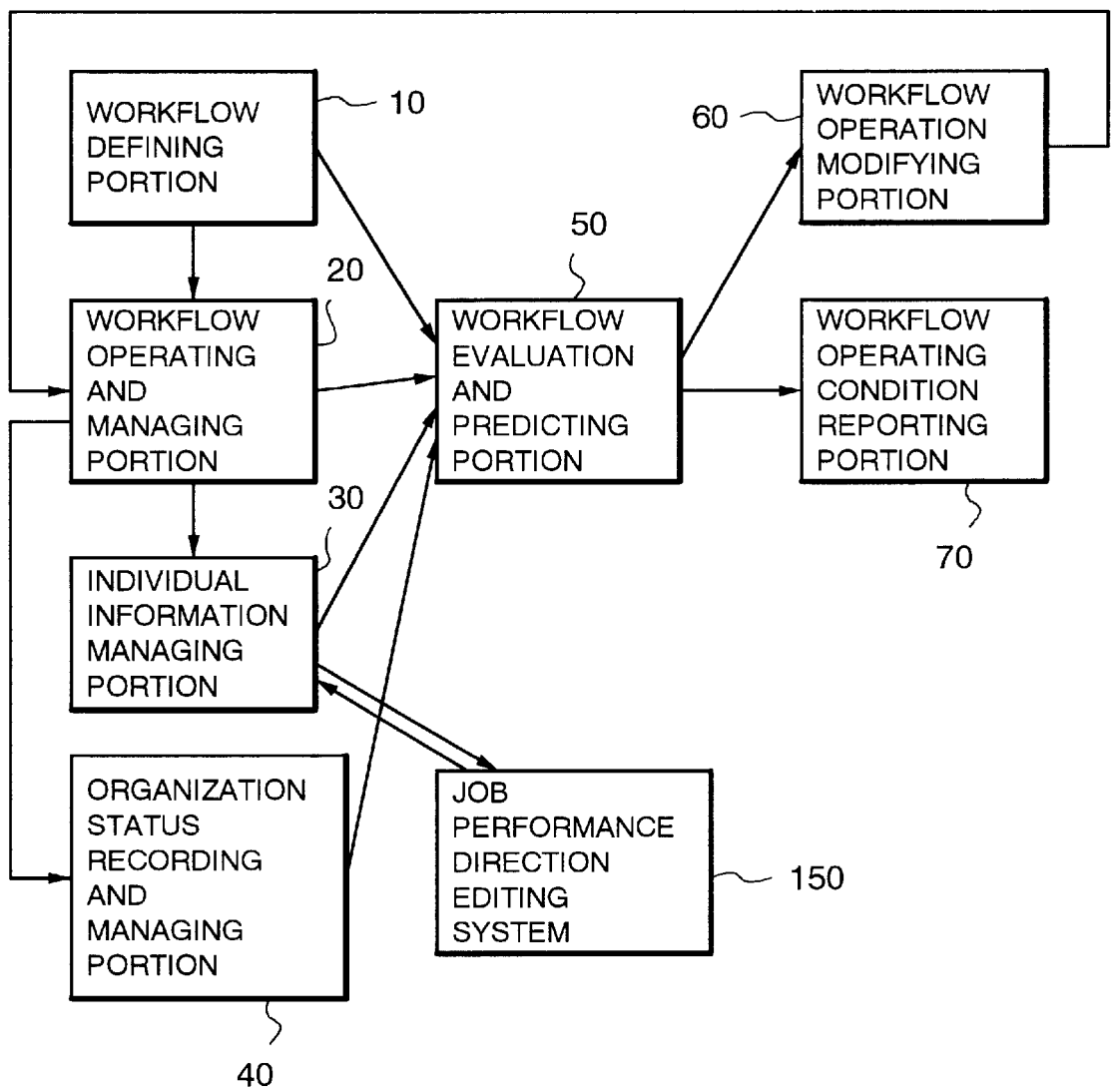
FIG. 15 is a block diagram showing a construction of the third embodiment of the workflow system according to the present invention.

FIG. 15 is a block diagram showing a construction of the third embodiment of a workflow system according to the invention.

As shown, the third embodiment of the workflow system includes the workflow defining portion 10 for performing defining of data in a workflow, the workflow operation managing portion 20 for operating and managing the workflow on the basis of the definition, the individual information managing portion 30 managing information relating to individuals involved in the workflow, the organization condition recording and managing portion 40 for managing status of progress of job performed by operation of the workflow over the entire organization, the workflow predicting and evaluating portion 50 for predicting and evaluating status of future operation of the job of the workflow, the workflow operation modifying portion 60 for modifying managing condition in the workflow operation managing portion 20, depending upon necessity, the workflow operating condition reporting portion 70 for reporting operating condition of the workflow job to a manager, and a job performing direction editing portion 150 for editing information related to the direction of performance of job stored in the organization condition recording and managing portion 40. It should be noted that the drawing illustrates only elements particularly related to the shown embodiment and other constructions irrelevant to the subject matter of the present invention has been neglected for keeping the disclosure simple enough for facilitating clear understanding of the invention. Also, it should be noted that the workflow defining portion 10, the workflow operation managing portion 20, the individual information managing portion 30, the organization information recording and managing portion 40, the workflow predicting and evaluating portion 50, the workflow operation modifying portion 60 and the workflow operating condition reporting portion 70 are identical to those illustrated and discussed in the first embodiment, and thus represented by the same reference numerals to the former embodiment and the detailed description there of omitted.

Figure 16:
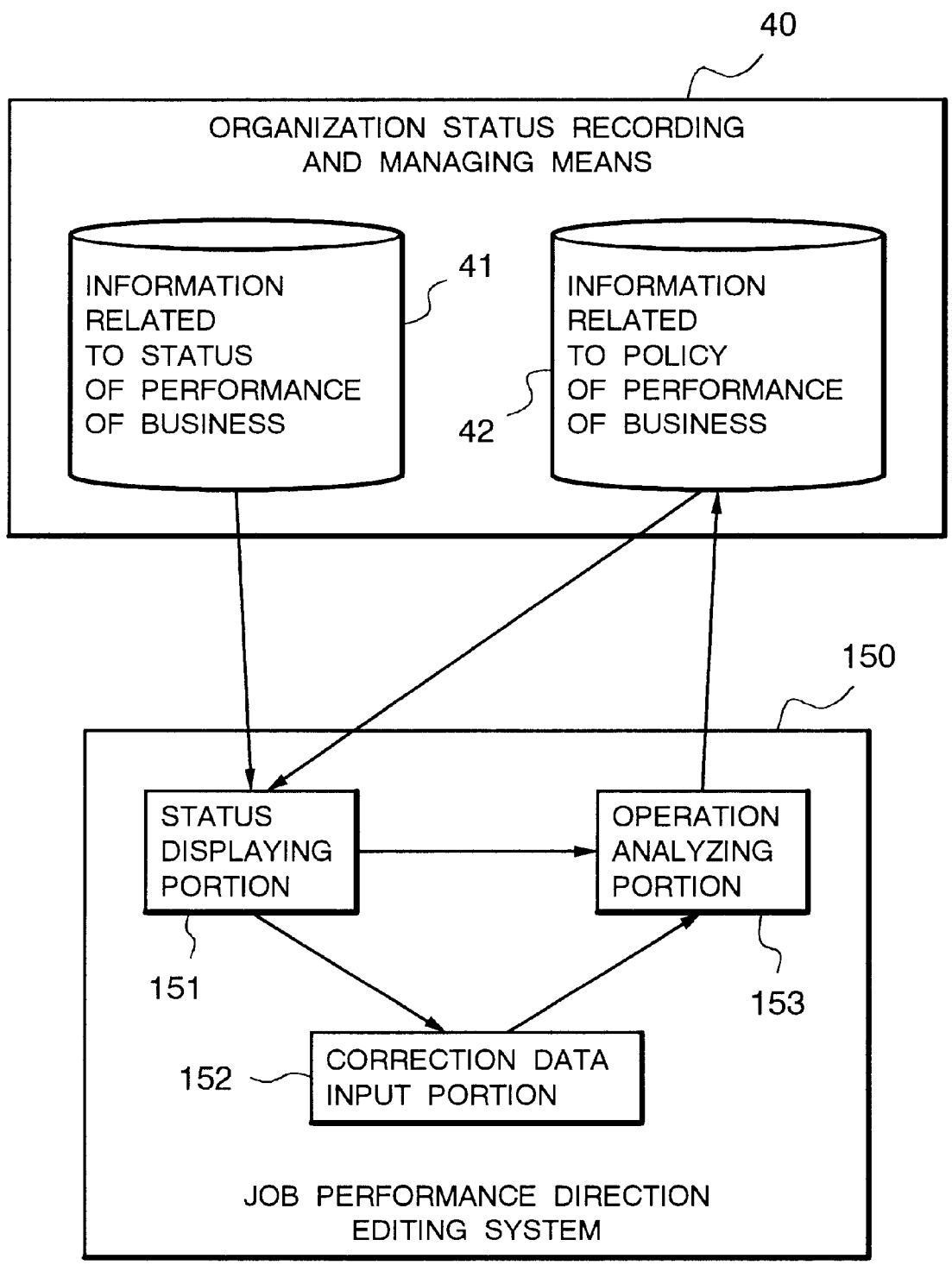
FIG. 16 is a block diagram showing a construction of a job performing direction editing device in the third embodiment of the workflow system.

FIG. 16 is a block diagram of the job performing direction editing portion 150.

As shown, the job performing direction editing portion 150 includes a status displaying portion 151 for displaying information relating to the status of performance of job, a correction data input portion 152 for correcting information displayed on the status displaying portion 151, and an operation analyzing portion 153 for making analysis of data input by the correction data input portion 152. As set forth above, in the organization condition recording and managing portion 40, information 41 related to status of performance of job and information 42 related to direction of performance of job.

The status displaying portion 151 makes reference to the information 41 related to status of performance of job and visually displays the content of the information. As set forth above, the information 41 related to status of performance of job contains (1) how many workflow jobs are executed within a certain period; (2) among data transferred between the unit jobs in the workflow jobs already processed, data which are particularly required to be stored; and (3) status of workflow job under control. The status displaying portion 151 makes the information visible in a predetermined format and display. For example, in case of the job trip slip, job trip budget consumption performance in the current month per each person who made job trip, accumulation of number of job trips in a year per job trip destination and per people who made job trips, or a value of function given for definition of target to be achieved, and so forth are displayed employing bar graph, circle graph and so forth. The graph to be used are preliminarily determined. Furthermore, the status displaying portion 151 makes reference to information 145 relating to direction of performance of the job and may be displayed with overlapping with a preliminarily determined target value to be achieved relating to the workflow job.

A correction data input portion 152 provides an operational environment for directly modifying the graph configuration visually displayed by the status displaying portion 151 or the target value to be achieved, which is similarly displayed, by means of input device, such as a mouse and so forth. Then, the content of the operation executed is then transferred to the operation analyzing portion 153.

Figure 17:
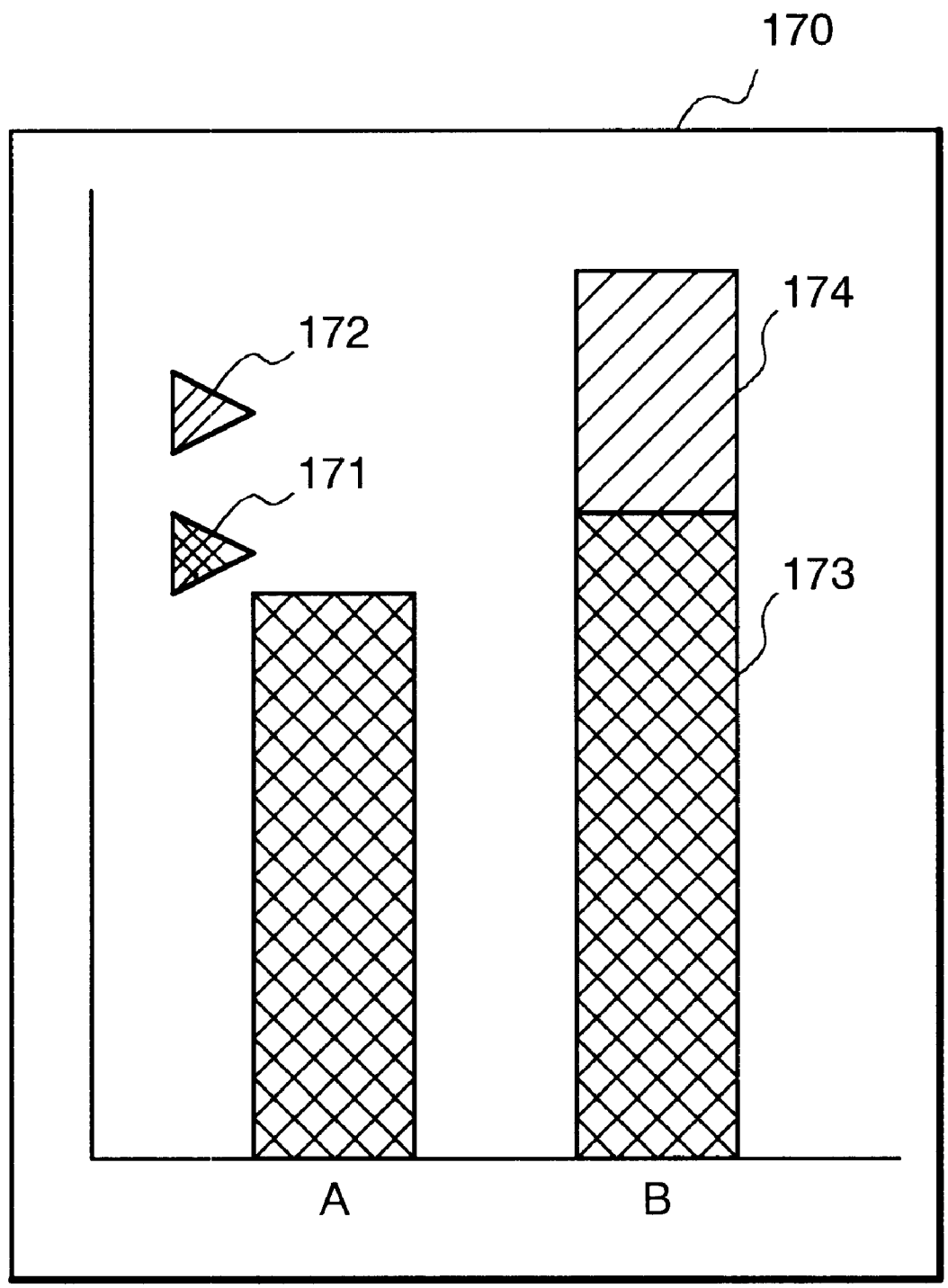
FIG. 17 is an example of display of a display screen by a status displaying portion in the third embodiment of the workflow system.

An example of operation employing the correction data input portion 152 will be discussed with reference to the graph of FIG. 17. In FIG. 17, a graph 170 is a graph representing performance of workflow job displayed by a status displaying portion 151. It should be noted that, initially, only portions indicated with thick mesh are displayed. A hatched portion is initially not displayed. Bar graph shows performance of jobs A and B. In the drawing, a target marker 171 is a value preliminarily set as a target to be achieved in the job A.

A correction data input portion 152 can perform operation for shifting a position of a target marker 171 of the graph of the job A to the position of a marker 172, and operation extended the performance graph 173 of the job B to the height of a bar graph 174, by means, such as dragging of the mouse on the display screen. In these operation, modification of the position of the target marker 171 means modification of the target for the job, and modification of the height of the performance graph 173 means newly setting of a target value (set to the height of the bar graph 174). In the shown example, discussion has been given for the example of bar graph, similar operation can be performed for modifying the performance or target to be achieved, displayed with graph, table or text in other form, such as circular graph, polygonal line graph.

The operation analyzing portion 153 receives the data string indicative of content of operation from the correction data input portion 152, and makes reference to the content of display of the status displaying portion 151 of the data string, and derives a new target by analyzing the meaning of the operation. Then, the newly derived target is written in the accumulated information 145 relating to direction of performance of the job in the organization condition recording and managing portion 40. As an example of analysis of meaning of the operation is that, analysis of coordinate value of a sequence of point string by operation of the mouse given by the correction data input portion 152 so that the target value is increased when the operation is performed to expand the bar graph and is decreased when the operation is performed to contract the bar graph. Also, depending upon kind of the displayed graph, system for analysis is differentiated. By providing the analysis system per kind of graph as knowledge, detailed setting becomes possible.

With the shown embodiment of the workflow system having the job performing direction editing portion 150 set forth above, business command, such as "progress ordering job for A company with highest preference", by operation of graph of number of orders, preferential order is automatically risen in cooperation with the workflow operation modifying portion 60, or notice lack of job amount to the person in charge by electronic mail or so forth by employing the workflow operating condition reporting portion 70.

Figure 18:
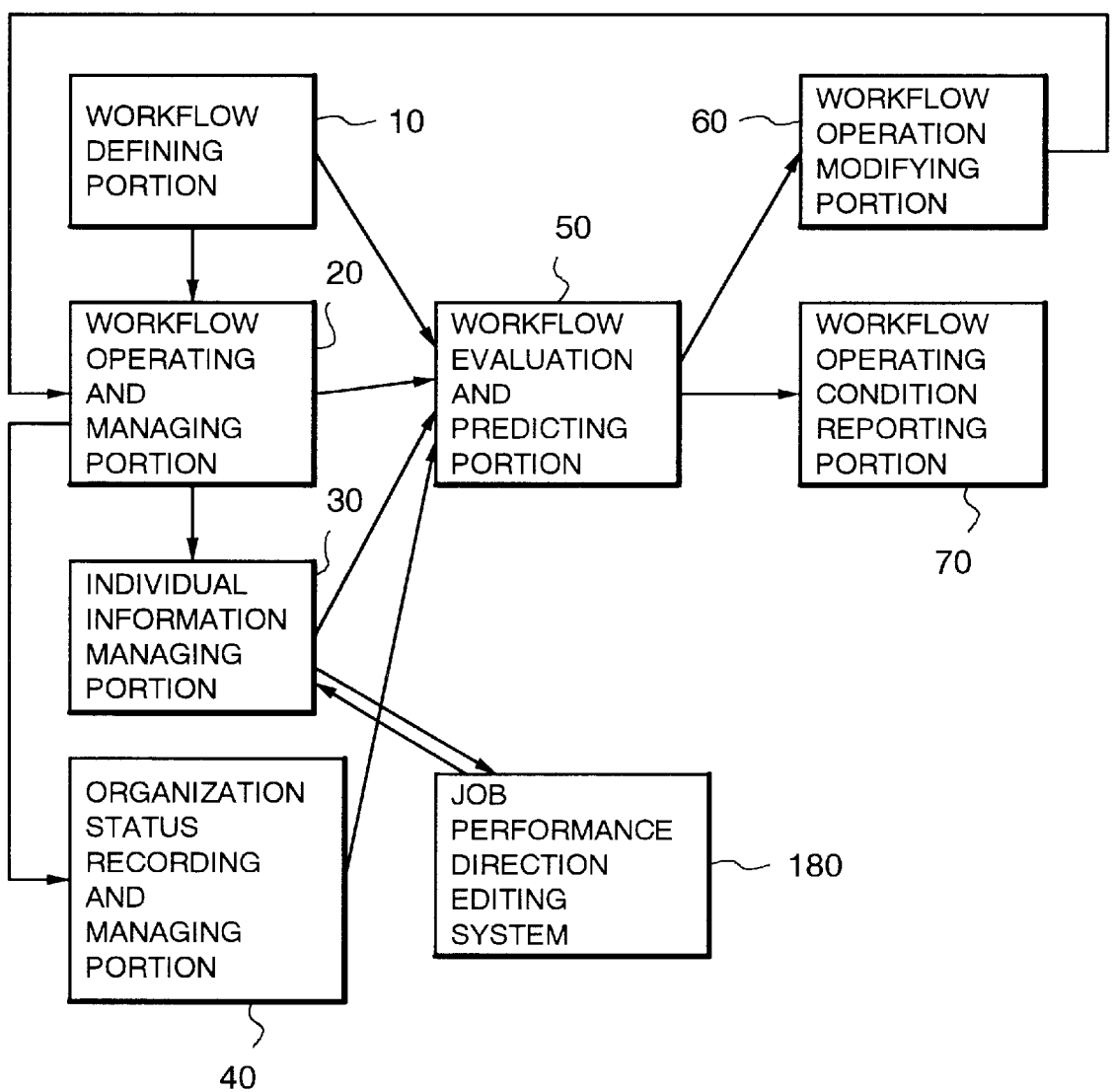
FIG. 18 is a block diagram showing a construction of the fourth embodiment of the workflow system according to the present invention.

FIG. 18 is a block diagram showing a construction of the fourth embodiment of a workflow system according to the invention.

As shown, the fourth embodiment of the workflow system includes a workflow defining portion 10 for performing defining of data in a workflow, a workflow operation managing portion 20 for operating and managing the workflow on the basis of the definition, an individual information managing portion 30 managing information relating to individuals involved in the workflow, an organization condition recording and managing portion 40 for managing status of progress of job performed by operation of the workflow over the entire organization, a workflow predicting and evaluating portion 50 for predicting and evaluating status of future operation of the job of the workflow, a workflow operation modifying portion 60 for modifying managing condition in the workflow operation managing portion 20 depending upon necessity, a workflow operating condition reporting portion 70 for reporting operating condition of the workflow job to a manager, and a job performance direction editing system 180 performs edition of information concerning direction of performance of job stored in the organization condition recording and managing portion 40. It should be noted that the drawing illustrates only elements particularly related to the shown embodiment and other constructions irrelevant to the subject matter of the present invention has been omitted for keeping the disclosure simple enough for facilitating clear understanding of the invention. Also, it should be noted that the workflow defining portion 10, the workflow operation managing portion 20, the individual information managing portion 30, the organization information recording and managing portion 40, the workflow predicting and evaluating portion 50, the workflow operation modifying portion 60 and the workflow operating condition reporting portion 70 are identical to those illustrated and discussed in the first embodiment, and thus represented by the same reference numerals to the former embodiment and the detailed description there of is neglected.

Figure 19:
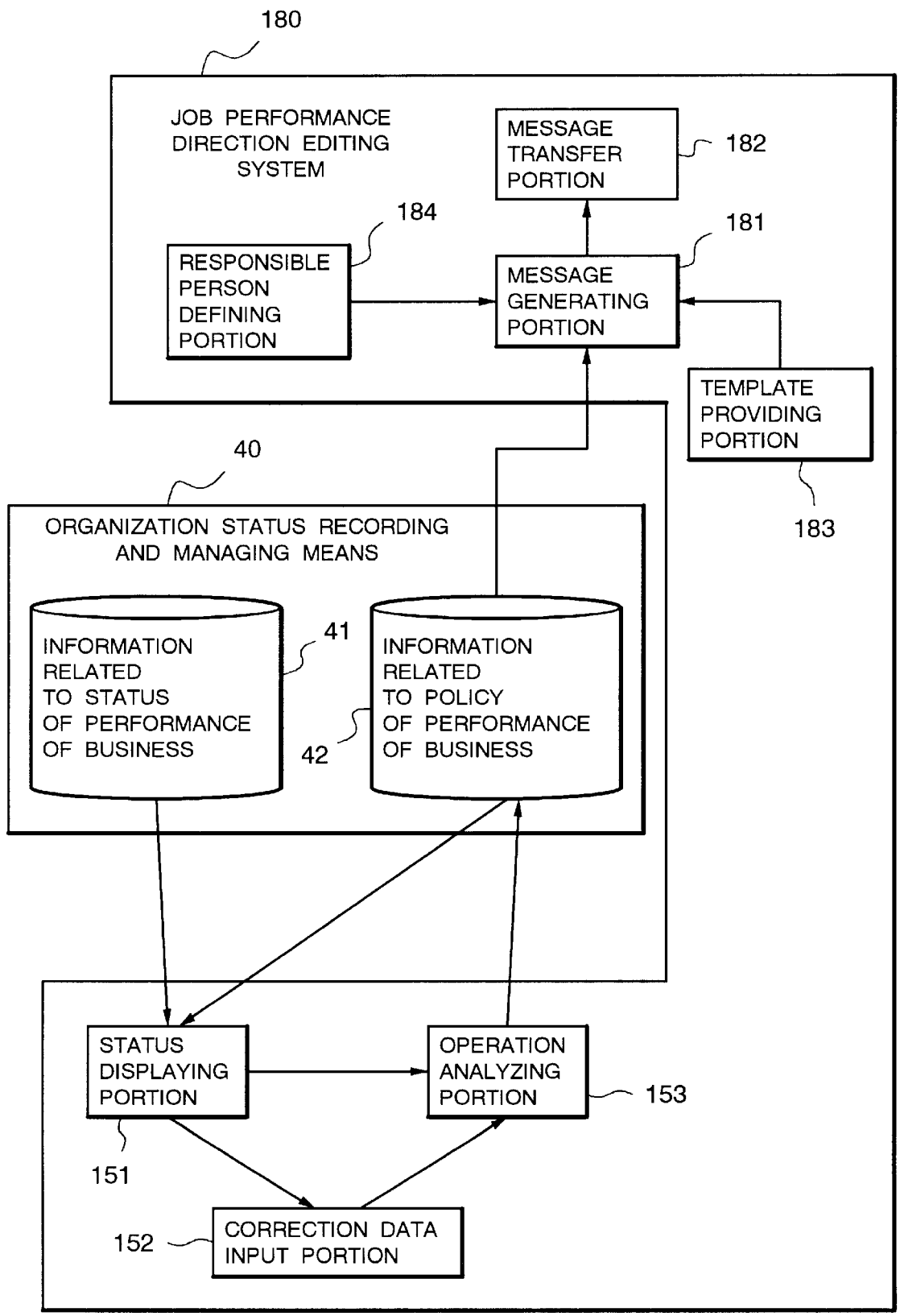
FIG. 19 is a block diagram showing a construction of a job performing direction editing device in the fourth embodiment of the workflow system.

FIG. 19 is a block diagram showing a construction of the job performance direction editing system 180.

As shown, the job performance direction editing system 180 includes a status displaying portion 151 for displaying information relating to the status of performance of job, a correction data input portion 152 for correcting information displayed on the status displaying portion 151, and an operation analyzing portion 153 for making analysis of data input by the correction data input portion 152, a message generating portion 181 generating a message according to a predetermined template, a template storing portion 182, a message output portion 183 for outputting the generated message and a responsible person defining portion 184 identifying the person in charge as the output destination of the message. It should be noted that the status displaying portion 151, the correction data input portion 152 and the operation analyzing portion 153 are the same as those in the third embodiment shown in FIG. 16 and thus are represented by the same reference numerals and detailed description thereof will be neglected.

The message generating portion 181 is a replacement of the workflow predicting and evaluating portion 50 of FIG. 1, and translates the target to be achieved into simple natural words.

The template preliminarily stored in the template storing portion 182 at least includes a word expressing the target to be achieved. For example, if the target to be achieved is related to the business result, a template "make business result of * company to be **" is provided.

The message generating portion 181, at generate command message by simple natural word only by burying necessary portion of the template. Furthermore, the message generating portion 181 automatically judges the destination to transfer the message. This judgement is performed according to the information of the person in charge defining portion 184. The person in charge defining portion 184 is a replacement of the workflow defining portion 10 in the first embodiment of FIG. 1, and provides information concerning person in charge for A company.

A message transferring means 182 is a replacement of the workflow operating condition reporting portion 70 of FIG. 1, and the command in the natural word is transferred to the destination determined by the electronic mail or a voice and so forth.

When the job performance direction editing system 180 set forth above is utilized, in addition to the workflow job, visual operation with respect to general data is converted into information relating to direction of performance of the job meant by the visual operation, and transferred to the person in charge in a form of message of electronic mail and so forth, and thus can provide visual user interface commanding the job.

Figure 20:
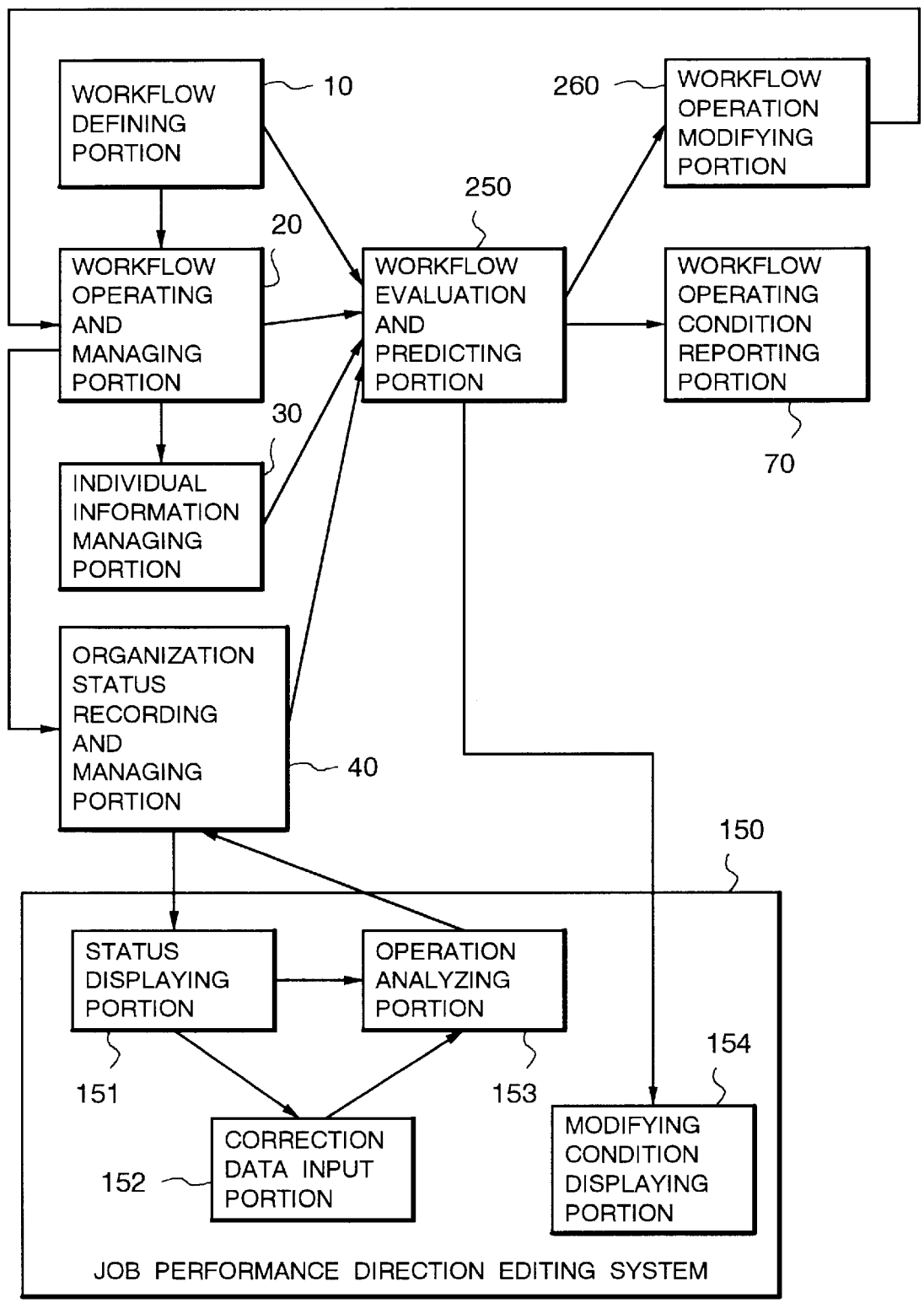
FIG. 20 is a block diagram showing a construction of the fifth embodiment of the workflow system according to the present invention.

FIG. 20 is a block diagram showing a construction of the fifth embodiment of a workflow system according to the invention.

As shown, the fifth embodiment of the workflow system includes the workflow defining portion 10 for performing defining of data in a workflow, the workflow operation managing portion 20 for operating and managing the workflow on the basis of the definition, the individual information managing portion 30 managing information relating to individuals involved in the workflow, the organization condition recording and managing portion 40 for managing status of progress of job performed by operation of the workflow over the entire organization, a workflow predicting and evaluating portion 250 for predicting and evaluating status of future operation of the job of the workflow, a workflow operation modifying portion 260 for modifying managing condition in the workflow operation managing portion 20 depending upon necessity, the workflow operating condition reporting portion 70 for reporting operating condition of the workflow job to a manager, and the job performing direction editing portion 150 for editing information related to the direction of performance of job stored in the organization condition recording and managing portion 40. It should be noted that the drawing illustrates only elements particularly related to the shown embodiment and other constructions irrelevant to the subject matter of the present invention has been omitted for keeping the disclosure simple enough for facilitating clear understanding of the invention. Also, it should be noted that the workflow defining portion 10, the workflow operation managing portion 20, the individual information managing portion 30, the organization information recording and managing portion 40, the workflow predicting and evaluating portion 50, the workflow operation modifying portion 60, the workflow operating condition reporting portion 70 and the status displaying portion 151, the correction data input portion 152 and operation analyzing portion 153 of business performing policy editing portion 150 are identical to those illustrated and discussed in the first embodiment of FIG. 1 and third embodiment of FIG. 16, and thus represented by the same reference numerals to the former embodiment and the detailed description there of is neglected.

In the shown embodiment, the workflow operation modifying portion 260 and the workflow predicting and evaluating portion 250 have similar functions to the workflow operation modifying portion 60 and the workflow predicting and evaluating portion 50 in the first embodiment, and in addition thereto, a function for receiving answer from the person in charge. On the other hand, the business performing policy editing portion 150 has a modifying condition displaying portion 154.

The workflow operation modifying portion 260 is responsive to the request of modification of operation of the workflow from the workflow predicting and evaluating portion 250 to preliminarily notice the content of modification to the individual information managing portion 30 of the responsible person associated with the modification in advance of activating the workflow operation managing portion 20. The individual information managing portion 30 may send inquiry to the responsible person of the job or according to a certain rule owned by the individual information managing portion 30 to make a judge whether the preliminarily notice of the may be accepted or not and send an answer to the workflow operation modifying portion 260. The workflow operation modifying portion 260 repeatedly perform such preliminary notice with respect to all of the responsible people. When all of the answers are positive, the workflow operation managing portion 20 is activated in the similar manner to the workflow operation modifying portion 60 of the first embodiment. On the other hand, when one or more answers are negative, the content is reported to the workflow predicting and evaluating portion 250 and, in such case, the workflow operating status is held not actuation.

The workflow predicting and evaluating portion 250 is responsive to the negative answer to appreciate that the attempt of modification of the workflow operation is failed. Then, prediction is performed again utilizing the knowledge provided by the knowledge providing portion 543 to study the workflow job, to execute measure by the workflow operation modifying portion 60 or the workflow operating condition reporting portion 70.

Also, the workflow predicting and evaluating portion 250 is responsive to the negative answer to appreciate that the attempt of modification of the workflow operation is failed, or when the direction of performance of the job is not been satisfied, notice is given to the user via the workflow operating condition reporting portion 70. At this time, failure of modification of operation of the workflow is also notice is sent to the job performance direction editing system 150. The modification condition display portion 154 added to the job performance direction editing system 150. The notice indicative of failure of modification is issued from the workflow predicting and evaluating portion 250.

On the other hand, the answer returned from the individual information managing portion 3C for the workflow operation modifying portion 60 is not always two ways of positive and negative, but can be an answer of conditional positive answer. An example is that, for preliminary notice of the modification of operation of the workflow to shorten the deadline for two days, and when the deadline is desired to be set at two days, and shortening two days is not possible but shortening for one day can be done. When the individual information managing portion 30 performs such answer, the workflow operation modifying portion 260 can transfer the content of the answer to the workflow predicting and evaluating portion 250, the workflow predicting and evaluating portion 250 can be utilize the content of answer in studying the modification of the operation can be made.

The modification condition displaying means 154 does not only display if the modification of the workflow is possible or not, but also may display the correction value in the job performance direction, which can be achieved. Such correction value becomes possible by transferring the value to be achieved, which is predicted by the workflow predicting and evaluating portion 250, to the modification condition displaying means 154.

Figure 21:
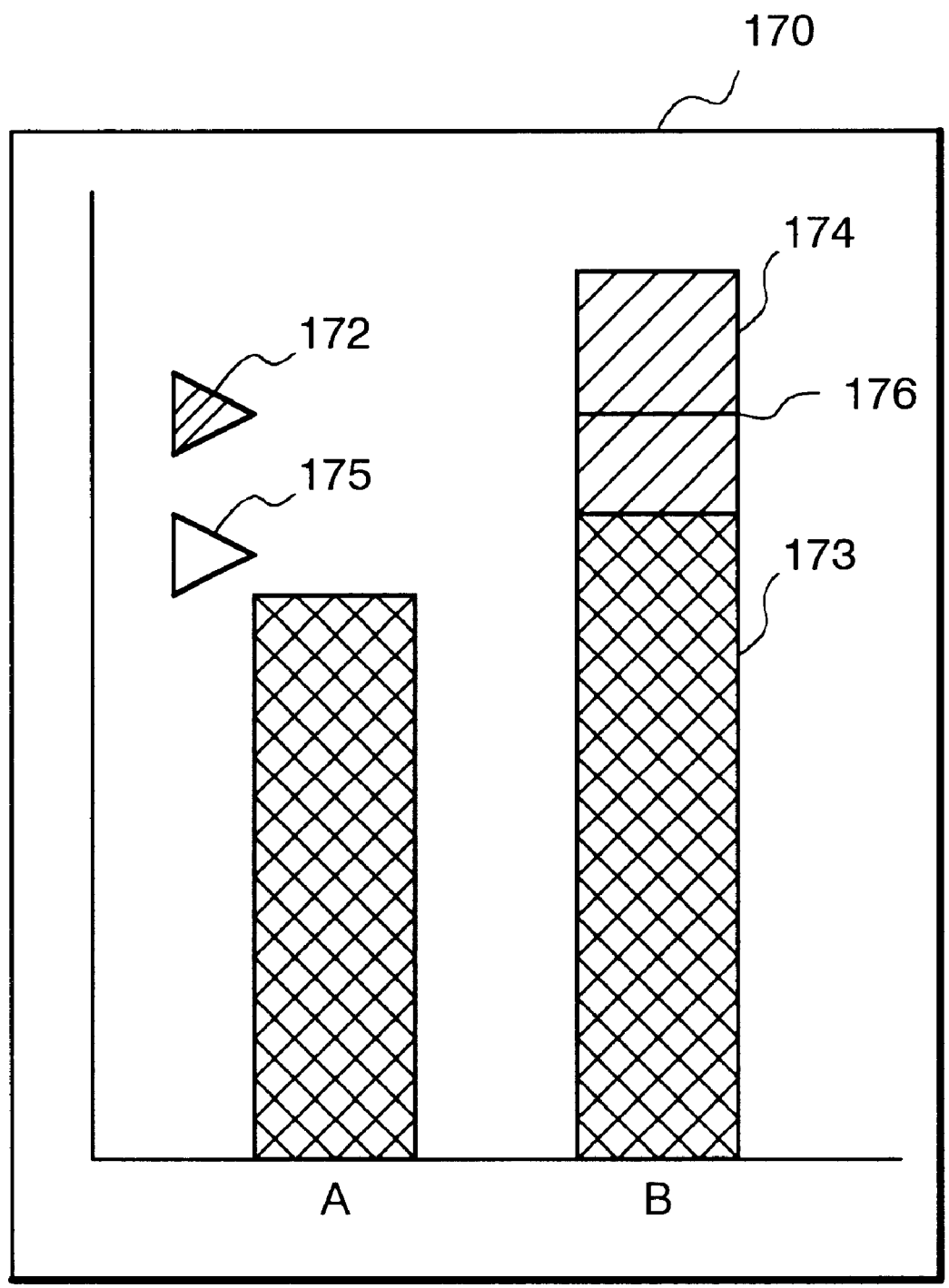
FIG. 21 is an illustration showing an example of display on a display screen by a modified condition display portion in the fifth embodiment of the workflow system.

When the correction value to be achieved is to be displayed on the modification condition displaying means 154, it will be more easy to understand to visually overlay by the correction data input portion 152, one example of display is shown in FIG. 21. FIG. 21 shows overlying display of the value to be achieved of the job performance direction. A marker 175 shows the corrected value relative to the marker 172 of the target value to be achieved. On the other hand, a solid line 176 shows a correction value relative to the target value 174 to be achieved.

In the foregoing four embodiments, the answer of the responsible person for the jobs with respect to the command for modification of the operation of the workflow job or the command of the operation, is fed back to reflect on adjustment of the workflow. Therefore, demand which cannot be accepted can be avoided to realize appropriate operation management of the workflow jobs.

As set forth above, the workflow system according to the present invention can successfully prevent occurrence of problems such as the expiration of deadlines and so forth by predicting future progress of workflow job.

On the other hand, the system may manage the target value to be achieved by the organization within a given period, in the workflow job satisfying a given condition. By this, with combination of the prediction result of the workflow job with the target value, it becomes possible to predict whether the target value can be achieved or not in advance. Thus, the workflow can be flexibly operated with taking measure for such problems.

In addition, since application of the workflow job can be modified by direct operation with monitoring progress of the workflow, work load associate with modification of operation can be reduced.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A workflow system comprising:
    workflow defining means for defining workflow information necessary for operating a workflow job to be realized by an order of execution of unit jobs for which a plurality of workers is involved;
    workflow operating and managing means for managing progress of the workflow job according to workflow information defined by said workflow defining means and urging execution of the unit jobs;
    individual information managing means for managing individual information relating to each worker involving each unit job; and
    workflow predicting and evaluating means for obtaining the workflow information defined by said workflow defining means, progress information indicative of progress of the workflow job managed by said workflow operating and managing means, and individual information managed by the individual information managing means, and for predicting future progress of the workflow job.

2. A workflow system as set forth in claim 1, wherein said individual information managing means receiving definition of said unit job relating to each worker from said workflow operating and managing means and preparing a job task table as a table, as a list of unit jobs to be executed by each worker, and the individual information managed by said individual information managing means includes an appointment table indicative of a constraint time of the schedule of the worker.

3. A workflow system as set forth in claim 2, wherein said workflow predicting and evaluating means comprises:

individual information temporary storage means for collecting copy of appointment table the individual information managed by said individual information managing means;

work completion simulation means for predicting a time for completing the job task provided to each worker with reference to said job task table and appointment table temporarily stored in said individual information temporary storage means;

completion time measuring means for obtaining workflow information defined by said workflow definition and progress information managed by said workflow operating and managing means, predicting a time to complete overall job by making prediction of time to complete each unit job of the workflow job under execution or before execution, and making judgement whether the workflow job may be completed or not on the basis of said workflow information.

4. A workflow system as set forth in claim 3, wherein said completion time predicting means studies definition of workflow information enabling keeping of a deadline and modifying said workflow information according to new definition when said completion time measuring means makes judgement that the workflow job will pass said deadline.

5. A workflow system as set forth in claim 3, further comprising work completion strategical model providing means for providing strategical model determining order for completing the job in job task defined in said job task table of said individual information and constraint time defined in said appointment table.

6. A workflow system as set forth in claim 1, wherein future behavior is predicted of said workflow by said workflow predicting and evaluating means by further providing a workflow operating status reporting means for reporting a detection of obstruction to a manager of said workflow job or a worker of said unit job.

7. A workflow system as set forth in claim 1, wherein said workflow predicting and evaluating means predicts future obstruction of the workflow job and further comprises workflow operation modifying means for transferring instructions for modifying said workflow information to said workflow operating and managing means to make the latter perform modifications.

8. A workflow system as set forth in claim 1, further comprising:

workflow operating status reporting means for detecting failure and reporting detection of failure to a manager of the workflow job or worker on said unit business when future obstruction of the workflow job is predicted by said workflow predicting and enabling;

workflow operation modifying means for transferring instruction for modifying said workflow information to said workflow operating and managing means make the latter to perform modification when said workflow predicting and evaluating means predicts future obstruction of workflow job;

said workflow predicting and evaluating means for reporting said failure employing said workflow operating status reporting means or performing modification of workflow information employing said workflow operation modifying means.

9. A workflow system as set forth in claim 1, further comprising:

organization status recording and managing means for defining a target to be achieved in terms of a maximum or minimum number for the workflow jobs, receiving progress status information indicative of progress condition from said workflow operating and managing means, comparing the progress status information and said target to be achieved;

said workflow predicting and evaluating means predicting future progress further predicting whether the achievement condition of said workflow job of the organization may satisfy the condition of said target to be achieved or not.

10. A workflow system as set forth in claim 9, wherein said individual information managed by individual information managing means includes a job task table as a list of unit jobs to be executed by each worker prepared on the basis of definition of said unit jobs relating to each worker managed by said workflow operating and managing means;

said workflow predicting and evaluating means comprises:

individual information temporary storage means for collecting copy of appointment table the individual information managed by said individual information managing means;

work completion simulation means for predicting a time for completing the job task provided to each worker with reference to said job task table and appointment table temporarily stored in said individual information temporary storage means;

completion time measuring means for obtaining workflow information defined by said workflow definition and progress information managed by said workflow operating and managing means, predicting a time to complete overall job by making prediction of time to complete each unit job of the workflow job under execution or before execution, and making judgement whether the workflow job may be completed or not on the basis of said workflow information.

11. A workflow system as set forth in claim 1, further comprising:

organization status recording and managing means for defining a target to be achieved in terms of a maximum or minimum number for the workflow jobs, receiving progress status information indicative of progress condition from said workflow operating and managing means, comparing the progress status information and said target to be achieved; and said workflow predicting and evaluating means predicting whether the achievement condition of said workflow job of the organization may satisfy said target.

12. A workflow system as set forth in claim 7, wherein said individual information managed by individual information managing means includes a job task table as a list of unit jobs to be executed by each worker prepared on the basis of definition of said unit jobs relating to each worker managed by said workflow operating and managing means;

said workflow predicting and evaluating means comprises:

individual information temporary storage means for collecting copy of appointment table the individual information managed by said individual information managing means;

work completion simulation means for predicting a time for completing the job task provided to each worker with reference to said job task table and appointment table temporarily stored in said individual information temporary storage means;

completion time measuring means for obtaining workflow information defined by said workflow defining definition and progress information managed by said workflow operating and managing means, predicting a time to complete overall job by making prediction of time to complete each unit job of the workflow job under execution or before execution, and making judgement whether the workflow job may be completed or not on the basis of said workflow information.

13. A workflow system comprising:

workflow defining means for defining workflow information necessary for operating a workflow job to be realized by an order of execution of unit jobs for which a plurality of workers are involved;

workflow operating and managing means for managing progress of the workflow job according to workflow information defined by said workflow defining means and urging execution of the unit jobs;

individual information managing means for managing individual information relating to each worker involving each unit job;

workflow predicting and evaluating means for obtaining the workflow information defined by said workflow defining means, progress information indicative of progress of the workflow job managed by said workflow operating and managing means, and individual information managed by the individual information managing means, and for predicting future progress of the workflow job;

workflow operating status reporting means for reporting detection of obstruction to a manager of said workflow job or worker of said unit job, when future behavior is predicted with said workflow by said workflow predicting and evaluating means; and workflow operating means receiving said workflow information from said workflow defining means, receiving said progress condition information from said workflow operating and managing means for displaying both information, inputting modification command for said workflow information from a manager to transfer to said workflow operating and managing means to make modification of workflow information.

14. A workflow system as set forth in claim 13, wherein said workflow operating means comprises:

workflow current status display means for displaying current progress status of said workflow information; and command input means receiving modification of workflow information from user by a graphical interface utilizing display of said workflow current status displaying means, deletion of workflow job, and receiving input for command for changing of person in charge of workflow job, and transferring to said workflow operating and managing means.

15. A workflow system as set forth in claim 14, wherein said command input means receives a command for modifying preferential order as a value indicative of difference of importance in comparison with other workflow job with respect to workflow job displayed in said workflow current status displaying means.

16. A workflow system comprising:

workflow defining means for defining workflow information necessary for operating a workflow job to be realized by an order of execution of unit jobs for which a plurality of workers are involved;

workflow operating and managing means for managing progress of the workflow job according to workflow information defined by said workflow defining means and urging execution of the unit jobs;

individual information managing means for managing individual information relating to each worker involving each unit job;

organization status recording and managing means for defining a target to be achieved in terms of a maximum or minimum number for the workflow jobs, receiving progress status information indicative of progress condition from said workflow operating and managing means, comparing the progress status information and said target to be achieved;

workflow predicting and evaluating means for obtaining the workflow information defined by said workflow defining means, progress information indicative of progress of the workflow job managed by said workflow operating and managing means, individual information managed by the individual information managing means, and achievement status information indicative of relationship between the performance of said workflow job managed by said organization status recording and managing means, and for predicting future progress of the workflow job; and job performance direction editing means receiving and displaying said achievement status information from said organization status recording and managing means, inputting editing command of said target to be achieved of the workflow job from the manager to transfer to said organization status recording and managing means for making the latter perform a correction of said target to be achieved for said workflow job.

17. A workflow system as set forth in claim 16, wherein said job performance direction editing means comprises:

status display means for displaying achievement status information indicative of relationship between the performance of the workflow job and the target to be achieved; and command input means for receiving input of editing command for the target to be achieved from the user through graphical interface utilizing display of said status display means and transfer to said organization status recording and managing means.

18. A workflow system as set forth in claim 17, wherein said status display means displays performance of workflow job and said target to be achieved in overlapping manner.

19. A workflow system as set forth in claim 17, wherein said status display means displays performance of workflow job and said target to be achieved in overlapping manner, and said command input means recognizes modification of position of display sign as modification of the target to be achieved to transfer the corresponding command to said organization status recording and managing means when the user modifies the position of the display sign indicative of the target to be achieved, displayed by said status display means.

20. A workflow system as set forth in claim 17, wherein said status display means displays a performance of the workflow job and said target to be achieved in an overlapping manner, and said command input means recognizes a modification of display of the performance as a modification of the target to be achieved and transfers the corresponding command to said organization status recording and managing means when the user modifies the performance of said workflow job as displayed by said status display means.

21. A workflow system comprising:
workflow defining means for defining workflow information necessary for operating a workflow job to be realized by an order of execution of unit jobs for which a plurality of workers are involved;
workflow operating and managing means for managing progress of the workflow job according to workflow information defined by said workflow defining means and urging execution of the unit jobs;
individual information managing means for managing individual information relating to each worker involving each unit job;
organization status recording and managing means for defining a target to be achieved in terms of a maximum or minimum number for the workflow jobs, receiving progress status information indicative of progress condition from said workflow operating and managing means, comparing the progress status information and said target to be achieved;
workflow predicting and evaluating means for obtaining the workflow information defined by said workflow defining means, progress information indicative of progress of the workflow job managed by said workflow operating and managing means, individual information managed by the individual information managing means, and achievement status information indicative of relationship between the performance of said workflow job managed by said organization status recording and managing means, and for predicting future progress of the workflow job;
job performance direction editing device having job performance direction editing means for receiving and editing said achievement status information from said organization status recording and managing means and designating a responsible person for said workflow job and transferring information concerning the designated person;
status display means for displaying achievement status information indicative of a relationship between the performance of the workflow job and the target to be achieved;
display operating means for enabling operation of a display of the performance and target to be achieved directly on the display screen by the user by a graphical interface utilizing the status display means;
operation analyzing means for converting the operation of the screen by means of said display operating means into a modification command of the target to be achieved;
individual defining means for defining the responsible person of the workflow job; and
message transferring means for transferring a message indicative of modification command of the target to be achieved of the workflow to the person in charge determined by said individual defining means.

22. A workflow system comprising:
workflow defining means for defining workflow information necessary for operating a workflow job to be realized by an order of execution of unit jobs for which a plurality of workers are involved;
workflow operating and managing means for managing progress of the workflow job according to workflow information defined by said workflow defining means and urging execution of the unit jobs;
individual information managing means for managing individual information relating to each worker involving each unit job;
workflow predicting and evaluating means for obtaining the workflow information defined by said workflow defining means, progress information indicative of progress of the workflow job managed by said workflow operating and managing means, and individual information managed by the individual information managing means, and for predicting future progress of the workflow job; and
workflow operation modifying means for transferring instruction for modifying workflow information defined by the workflow defining means to said workflow operating and managing means to modify the workflow information when a obstruction against further progress of workflow job is predicted by said workflow predicting and evaluating means.

23. A workflow system as set forth in claim 22, wherein said workflow operation modifying means
preliminarily notifies modification of said workflow information with respect to each of responsible person of each unit job consisting said workflow job in advance of feeding the instruction for modifying the workflow information to said workflow operating and managing means,
receives answer from said responsible person whether the modified workflow information is accepted or not,
transfers the instruction for modification of said workflow information to said workflow operating and managing means only when all of responsible people accept the workflow information after modification.

24. A workflow system as set forth in claim 23, wherein said workflow operation modifying means receives acceptance condition for modification of said workflow information depending upon necessity when answer is received from each responsible person, and transfers the received acceptance condition for modification of said workflow information to said workflow predicting and evaluating means, and
said workflow predicting and evaluating means inputs said acceptance condition for modification of workflow information and newly performs prediction of future progress of workflow job according to said acceptance condition.

25. A workflow system as set forth in claim 24, which further includes modifying condition displaying means for displaying acceptance condition for modification of workflow information from said responsible person.

26. A workflow system as set forth in claim 25, wherein said modifying condition displaying means displays the acceptance condition for modification of said workflow information, performance of the workflow job and a target to be achieved in overlapping manner.

* * * * *